(12) United States Patent
Narasingarayanapeta et al.

(10) Patent No.: US 12,436,707 B2
(45) Date of Patent: *Oct. 7, 2025

(54) USAGE OF Op LOGS TO SYNCHRONIZE ACROSS PRIMARY AND SECONDARY STORAGE CLUSTERS OF A CROSS-SITE DISTRIBUTED STORAGE SYSTEM AND LIGHTWEIGHT Op LOGGING

(71) Applicant: NetApp, Inc., San Jose, CA (US)

(72) Inventors: Krishna Murthy Chandraiah Setty Narasingarayanapeta, Bangalore (IN); Akhil Kaushik, Karnataka (IN); Nagaraj Lalsangi, Cary, NC (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,649

(22) Filed: Jan. 24, 2024

(65) Prior Publication Data

US 2024/0160374 A1 May 16, 2024

Related U.S. Application Data

(63) Continuation of application No. 17/510,788, filed on Oct. 26, 2021, now Pat. No. 11,893,261.

(30) Foreign Application Priority Data

May 5, 2021 (IN) .............................. 202141020578
May 5, 2021 (IN) .............................. 202141020579

(51) Int. Cl.
*G06F 3/06* (2006.01)
(52) U.S. Cl.
CPC ............ *G06F 3/065* (2013.01); *G06F 3/0613* (2013.01); *G06F 3/0619* (2013.01);
(Continued)

(58) Field of Classification Search
CPC ...... G06F 3/065; G06F 3/0613; G06F 3/0619; G06F 3/0631; G06F 3/0659; G06F 3/067;
(Continued)

(56) References Cited

U.S. PATENT DOCUMENTS 5,742,792 A 4/1998 Yanai et al.
6,163,856 A 12/2000 Dion et al.
(Continued)

OTHER PUBLICATIONS

Corrected Notice of Allowance mailed on Nov. 8, 2023 for U.S. Appl. No. 18/158,957, filed Jan. 24, 2023, 2 pages.
(Continued)

*Primary Examiner* — Hiep T Nguyen
(74) *Attorney, Agent, or Firm* — Jaffery Watson Hamilton & DeSanctis LLP

(57) ABSTRACT

In one embodiment, a method comprises maintaining state information regarding a data synchronous replication status for a storage object of a primary storage cluster and a replicated storage object of a secondary storage cluster. The method includes temporarily disallowing input/output (I/O) operations for the storage object when the storage object of the primary storage cluster has a failure, which causes an internal state as out of sync for the storage object while maintaining an external state as in sync for external entities. The method performs persistent inflight tracking and reconciliation of I/O operations with a first Op log of the primary storage cluster and a second Op log of the secondary storage cluster and performs a resynchronization between the storage object and the replicated storage object based on the persistent inflight tracking and reconciliation of I/O operations.

20 Claims, 15 Drawing Sheets

(52) U.S. Cl.
CPC .......... *G06F 3/0631* (2013.01); *G06F 3/0653* (2013.01); *G06F 3/0659* (2013.01); *G06F 3/067* (2013.01)

(58) Field of Classification Search
CPC ............. G06F 11/1471; G06F 11/2097; G06F 11/2094
See application file for complete search history.

(56) References Cited

U.S. PATENT DOCUMENTS

| | | | |
|---|---|---|---|
| 6,389,551 | B1 | 5/2002 | Yount |
| 6,415,372 | B1 | 7/2002 | Zakai et al. |
| 6,732,124 | B1 | 5/2004 | Koseki et al. |
| 7,039,827 | B2 | 5/2006 | Meyer et al. |
| 7,475,204 | B2 | 1/2009 | Buah et al. |
| 7,500,014 | B1 | 3/2009 | Jacobson et al. |
| 7,631,066 | B1 | 12/2009 | Schatz et al. |
| 7,640,451 | B2 | 12/2009 | Meyer et al. |
| 7,890,626 | B1 | 2/2011 | Gadir |
| 8,335,761 | B1 | 12/2012 | Natanzon |
| 8,498,967 | B1 | 7/2013 | Chatterjee et al. |
| 8,645,623 | B1 | 2/2014 | O'Shea et al. |
| 8,856,583 | B1 | 10/2014 | Visser et al. |
| 8,874,960 | B1 | 10/2014 | Khan et al. |
| 9,189,341 | B1 | 11/2015 | Natanzon et al. |
| 9,875,042 | B1 | 1/2018 | Natanzon et al. |
| 10,412,066 | B1 | 9/2019 | Vemuri |
| 10,489,230 | B1 | 11/2019 | Chen et al. |
| 10,496,320 | B2 | 12/2019 | Eisler et al. |
| 10,725,691 | B1 | 7/2020 | Kaushik et al. |
| 10,761,768 | B1 | 9/2020 | Kaushik et al. |
| 11,036,423 | B2 | 6/2021 | Kaushik et al. |
| 11,089,105 | B1 | 8/2021 | Karumbunathan et al. |
| 11,327,857 | B2 | 5/2022 | Bhargava et al. |
| 11,360,867 | B1 | 6/2022 | Subramanian et al. |
| 11,409,622 | B1 | 8/2022 | Kaushik et al. |
| 11,481,139 | B1 | 10/2022 | Vijayan et al. |
| 11,537,314 | B1 | 12/2022 | Subramanian et al. |
| 11,593,016 | B2 | 2/2023 | Kaushik et al. |
| 11,853,589 | B2 | 12/2023 | Narasingarayanapeta |
| 11,893,261 | B2 * | 2/2024 | Narasingarayanapeta ................. G06F 3/065 |
| 11,907,562 | B2 | 2/2024 | Narasingarayanapeta |
| 11,928,352 | B2 | 3/2024 | Narasingarayanapeta |
| 12,204,786 | B2 | 1/2025 | Narasingarayanapeta |
| 12,321,627 | B2 | 6/2025 | Narasingarayanapeta |
| 2002/0132613 | A1 | 9/2002 | Leung et al. |
| 2004/0153719 | A1 | 8/2004 | Achiwa et al. |
| 2004/0267809 | A1 | 12/2004 | East et al. |
| 2005/0229034 | A1 | 10/2005 | Fujibayashi |
| 2005/0270855 | A1 | 12/2005 | Earhart et al. |
| 2006/0095478 | A1 | 5/2006 | Cherkauer et al. |
| 2006/0136354 | A1 | 6/2006 | Bell et al. |
| 2006/0236048 | A1 | 10/2006 | Deguchi et al. |
| 2007/0016754 | A1 | 1/2007 | Testardi |
| 2007/0180307 | A1 | 8/2007 | Zohar et al. |
| 2007/0234006 | A1 | 10/2007 | Radulescu et al. |
| 2008/0201702 | A1 | 8/2008 | Bunn |
| 2009/0043979 | A1 | 2/2009 | Jarvis |
| 2009/0070528 | A1 | 3/2009 | Bartfai et al. |
| 2009/0089609 | A1 | 4/2009 | Baba |
| 2009/0307530 | A1 | 12/2009 | Tarta |
| 2010/0064168 | A1 | 3/2010 | Smoot et al. |
| 2010/0082962 | A1 | 4/2010 | Srinivasan et al. |
| 2010/0161554 | A1 | 6/2010 | Datuashvili et al. |
| 2011/0106855 | A1 | 5/2011 | Resch et al. |
| 2011/0314148 | A1 | 12/2011 | Petersen et al. |
| 2012/0151249 | A1 | 6/2012 | Swan et al. |
| 2013/0159620 | A1 | 6/2013 | Sakashita et al. |
| 2013/0254590 | A1 | 9/2013 | Chercoles Sanchez et al. |
| 2014/0298136 | A1 | 10/2014 | Resch et al. |
| 2015/0006949 | A1 | 1/2015 | Bittles et al. |
| 2015/0058838 | A1 | 2/2015 | Tsirkin |
| 2015/0169414 | A1 | 6/2015 | Lalsangi et al. |
| 2016/0077917 | A1 | 3/2016 | Battepati et al. |
| 2016/0110378 | A1 | 4/2016 | Mu et al. |
| 2016/0366226 | A1 | 12/2016 | Friedman et al. |
| 2017/0093983 | A1 | 3/2017 | Everhart et al. |
| 2018/0246658 | A1 | 8/2018 | Bretschneider et al. |
| 2018/0260125 | A1 | 9/2018 | Botes et al. |
| 2018/0352032 | A1 | 12/2018 | Liu et al. |
| 2019/0004908 | A1 | 1/2019 | Gopinath et al. |
| 2019/0034286 | A1 | 1/2019 | Brown et al. |
| 2019/0212924 | A1 | 7/2019 | Ward et al. |
| 2019/0229978 | A1 | 7/2019 | Rajvaidya et al. |
| 2019/0347352 | A1 | 11/2019 | Gochkov et al. |
| 2019/0394266 | A1 | 12/2019 | Fukuyama et al. |
| 2020/0027898 | A1 | 1/2020 | Paul et al. |
| 2020/0034258 | A1 | 1/2020 | Avraham et al. |
| 2020/0035627 | A1 | 1/2020 | Iguchi et al. |
| 2020/0050495 | A1 | 2/2020 | Voutilainen et al. |
| 2020/0050587 | A1 | 2/2020 | Kaushik et al. |
| 2020/0081801 | A1 | 3/2020 | Brown et al. |
| 2020/0125460 | A1 | 4/2020 | Selvaraj et al. |
| 2020/0133520 | A1 | 4/2020 | Patnaik et al. |
| 2020/0137157 | A1 | 4/2020 | Joseph et al. |
| 2020/0250151 | A1 | 8/2020 | Yin et al. |
| 2020/0250171 | A1 | 8/2020 | Yin et al. |
| 2020/0273984 | A1 | 8/2020 | Nakano et al. |
| 2020/0278984 | A1 | 9/2020 | Kaushik et al. |
| 2020/0301787 | A1 | 9/2020 | Cabral et al. |
| 2020/0319982 | A1 | 10/2020 | Rusev et al. |
| 2021/0165573 | A1 | 6/2021 | Demoor et al. |
| 2021/0303165 | A1 | 9/2021 | Kaushik et al. |
| 2021/0374157 | A1 | 12/2021 | Reddy et al. |
| 2022/0019350 | A1 | 1/2022 | Karr |
| 2022/0121533 | A1 | 4/2022 | Kumar et al. |
| 2022/0357855 | A1 | 11/2022 | Narasingarayanapeta |
| 2022/0374321 | A1 | 11/2022 | Kaushik et al. |
| 2023/0110776 | A1 | 4/2023 | Subramanian et al. |
| 2023/0121272 | A1 | 4/2023 | Subramanian et al. |
| 2023/0168834 | A1 | 6/2023 | Narasingarayanapeta |
| 2024/0168671 | A1 | 5/2024 | Narasingarayanapeta |
| 2025/0165177 | A1 | 5/2025 | Thakur et al. |

OTHER PUBLICATIONS

Non-Final Office Action mailed on Feb. 1, 2024 for U.S. Appl. No. 18/158,947, filed Jan. 24, 2023, 11 pages.
Non-Final Office Action mailed on Feb. 17, 2023 for U.S. Appl. No. 17/510,795, filed Oct. 26, 2021, 11 pages.
Notice of Allowance mailed Aug. 14, 2023 for U.S. Appl. No. 18/158,957, filed Jan. 24, 2023, 08 pages.
Notice of Allowance mailed Dec. 13, 2022 for U.S. Appl. No. 17/219,815, filed Mar. 31, 2021.
Notice of Allowance mailed Jun. 28, 2023 for U.S. Appl. No. 18/158,947, filed Jan. 24, 2023, 8 pages.
Notice of Allowance mailed Nov. 2, 2022 for U.S. Appl. No. 17/495,990, filed Oct. 7, 2021, 8 pages.
Notice of Allowance mailed Nov. 18, 2022 for U.S. Appl. No. 17/219,812, filed Mar. 31, 2021, 12 pages.
Notice of Allowance mailed Oct. 31, 2022 for U.S. Appl. No. 17/219,812, filed Mar. 31, 2021, 9 pages.
Notice of Allowance mailed on Feb. 8, 2024 for U.S. Appl. No. 17/510,795, filed Oct. 26, 2021, 02 pages.
Notice of Allowance mailed on Jan. 2, 2024 for U.S. Appl. No. 17/510,788, filed Oct. 26, 2021, 02 pages.
Notice of Allowance mailed on Jan. 19, 2024 for U.S. Appl. No. 17/861,768, filed Jul. 11, 2022, 03 pages.
Notice of Allowance mailed on Jul. 7, 2023 for U.S. Appl. No. 17/510,795, filed Oct. 26, 2021, 08 pages.
Notice of Allowance mailed on Jul. 26, 2023 for U.S. Appl. No. 17/510,795, filed Oct. 26, 2021, 3 pages.
Notice of Allowance mailed on Jun. 14, 2023 for U.S. Appl. No. 17/505,962, filed Oct. 20, 2021, 8 pages.
Notice of Allowance mailed on Jun. 20, 2023 for U.S. Appl. No. 17/510,788, filed Oct. 26, 2021, 7 pages.
Notice of Allowance mailed on Nov. 17, 2023 for U.S. Appl. No. 18/158,957, filed Jan. 24, 2023, 2 pages.

(56) References Cited

OTHER PUBLICATIONS

Notice of Allowance mailed on Oct. 6, 2023 for U.S. Appl. No. 17/861,768, filed Jul. 11, 2022, 09 pages.
Notice of Allowance mailed on Oct. 12, 2023 for U.S. Appl. No. 17/510,795, filed Oct. 26, 2021, 7 pages.
Notice of Allowance mailed on Oct. 19, 2023 for U.S. Appl. No. 17/861,768, filed Jul. 11, 2022, 2 pages.
Notice of Allowance mailed on Oct. 19, 2023 for U.S. Appl. No. 18/158,947, filed Jan. 24, 2023, 8 pages.
Notice of Allowance mailed on Oct. 25, 2023 for U.S. Appl. No. 17/510,795, filed Oct. 26, 2021, 2 pages.
Notice of Allowance mailed on Sep. 28, 2023 for U.S. Appl. No. 17/510,788, filed Oct. 26, 2021, 07 pages.
Pan L, "Paxos at Its Heart is Very Simple," Distributed System, 2018, Retrieved From : URL: https://blog.the-pans.com/paxos-explained/, pp. 1-12.
U.S. Non-Final Office action dated Dec. 21, 2021 in U.S. Appl. No. 17/238,829, filed Apr. 23, 2021, 20 pages.
U.S. Notice of Allowance dated Apr. 6, 2022 in U.S. Appl. No. 17/238,829, filed Apr. 23, 2021, 9 pages.
U.S. Notice of Allowance mailed Jun. 24, 2022 in U.S. Appl. No. 17/219,816, filed Mar. 31, 2021, 8 pages.
U.S. Notice of Allowance mailed May 6, 2022 in U.S. Appl. No. 17/219,746, filed Mar. 31, 2021, 18 pages.
U.S. Notice of Allowance mailed Oct. 26, 2022 in U.S. Appl. No. 17/219,812, filed Mar. 31, 2021, 9 pages.
Final Office Action mailed May 20, 2024 for U.S. Appl. No. 18/158,947, filed Jan. 24, 2023, 13 pages.
Non-Final Office Action mailed on Aug. 28, 2024 for U.S. Appl. No. 18/424,244, filed Jan. 26, 2024, 10 pages.
Notice of Allowance mailed on Aug. 5, 2024 for U.S. Appl. No. 18/158,947, filed Jan. 24, 2023, 08 pages.
Notice of Allowance mailed on Dec. 16, 2024 for U.S. Appl. No. 18/158,947, filed Jan. 24, 2023, 03 pages.
Notice of Allowance mailed on Feb. 3, 2025 for U.S. Appl. No. 18/424,244, filed Jan. 26, 2024, 07 pages.

* cited by examiner

USAGE OF Op LOGS TO SYNCHRONIZE ACROSS PRIMARY AND SECONDARY STORAGE CLUSTERS OF A CROSS-SITE DISTRIBUTED STORAGE SYSTEM AND LIGHTWEIGHT Op LOGGING

CROSS-REFERENCE TO RELATED APPLICATIONS

This application is a continuation of U.S. patent application Ser. No. 17/510,788, filed Oct. 26, 2021, which claims the benefit of Indian Provisional Application No. 202141020578, filed on May 5, 2021, and Indian Provisional Application No. 202141020579, filed on May 5, 2021, which are hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, NetApp, Inc.

FIELD

Various embodiments of the present disclosure generally relate to multi-site distributed data storage systems. In particular, some embodiments relate to usage of operation (OP) logs to synchronize across primary and secondary storage clusters of a cross-site distributed storage system (e.g., cross-site high-availability (HA) storage solutions) and lightweight Op logging.

BACKGROUND

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

Business enterprises rely on multiple clusters for storing and retrieving data. Each cluster may be a separate data center with the clusters able to communicate over an unreliable network. The network can be prone to failures leading to connectivity issues such as transient or persistent connectivity issues that disrupt operations of a business enterprise.

SUMMARY

Systems and methods are described for performing persistent inflight tracking of operations (Ops) and resynchronization between storage objects within a cross-site storage solution. According to one embodiment, a method performed by one or more processing resources of a distributed storage system comprises maintaining state information regarding a data synchronous replication status for a storage object of a primary storage cluster with the storage object being replicated to a replicated storage object of a secondary storage cluster. The method includes temporarily disallowing input/output (I/O) operations for the storage object when the storage object of the primary storage cluster has a failure, which causes an internal state as out of sync for the storage object of the primary storage cluster while maintaining an external state as in sync for external entities in order to provide time for reestablishing synchronous replication within duration of an operation (Op) timeout period. The method further includes performing persistent inflight tracking and reconciliation of I/O operations with a first Op log of the primary storage cluster and a second Op log of the secondary storage cluster and performing a resynchronization between the storage object and the replicated storage object based on the persistent inflight tracking and reconciliation of I/O operations with the first Op log of the primary storage cluster and the second Op log of the secondary storage cluster.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
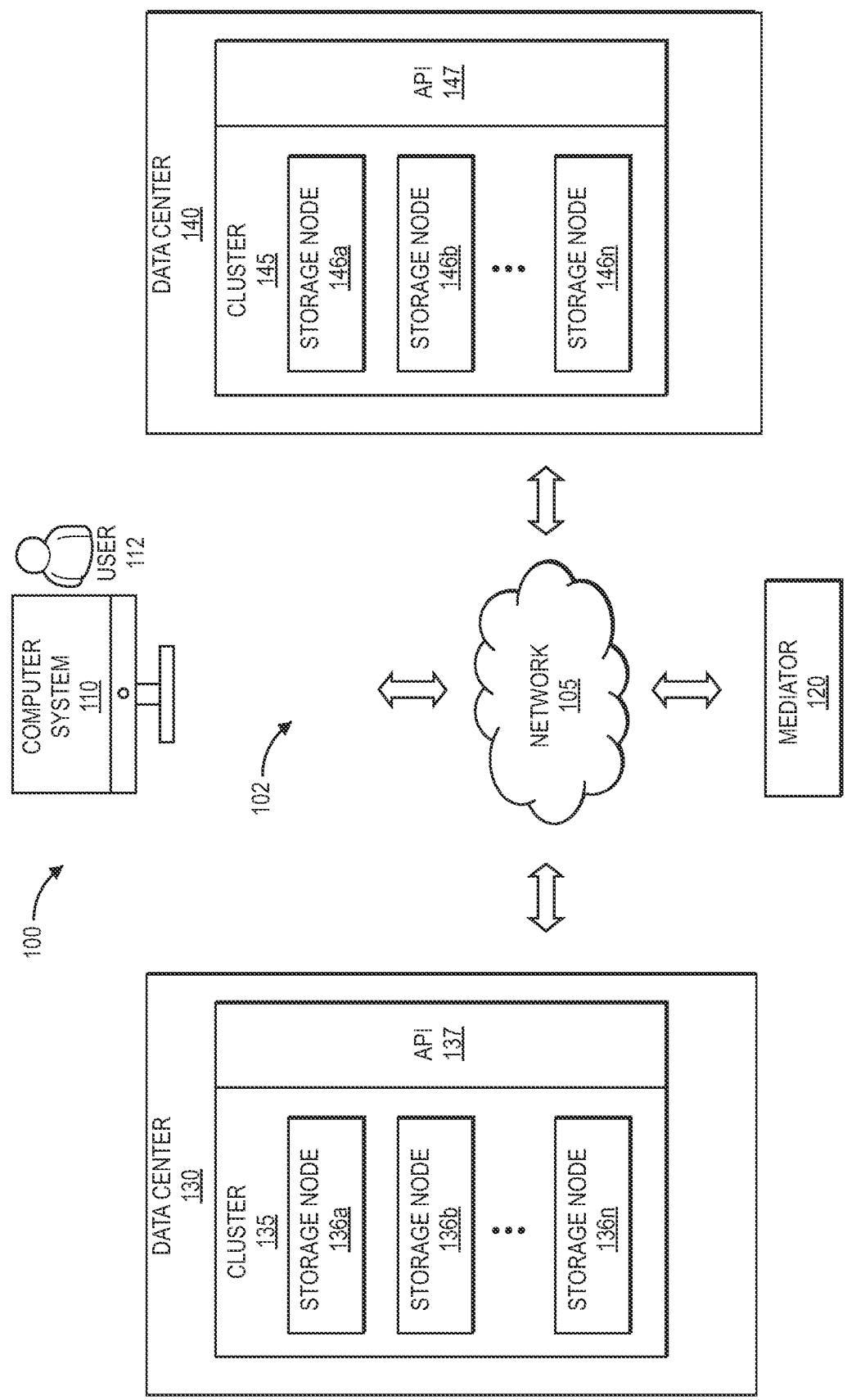
FIG. 1 is a block diagram illustrating an environment in which various embodiments may be implemented.

Systems and methods are described for efficiently tracking and reconciling inflight operations and fast resynchronization within a cross-site distributed storage system to provide zero recovery point objective (RPO) protection. In the context of cross-site distributed storage system (including cross-site HA storage solutions that perform synchronous data replication to support zero RPO protection), a certain degree of consistency over time is maintained between a mirror copy and a primary dataset depending upon the particular implementation. Certain operations on a storage object (e.g., data container/volume) of a consistency group (CG) having numerous data containers/volumes hosting the data at issue should be managed independently for an out of sync storage object in order to avoid transitioning all storage objects of a CG out of sync and avoid delays needed for transitioning all storage objects with resynchronization from out of sync back in sync.

In one example, a primary and a secondary storage cluster are diverged due to inflight I/O operations (ops) that are not yet acknowledged to a client device. An inflight op is an op that is in progress on either primary or secondary storage cluster and its response is held by a synchronous replication circuitry (SR circuitry), which includes a splitter component (or replicating component). An inflight Op can be a data Op (e.g., write, punch hole, etc.) or a metadata op (e.g., create, unlink, set attribute, etc.). An inflight Op can have the following states:

request received: Op is received by splitter component
    primary sent: Op is in progress with file system of SR circuitry of primary storage cluster
    primary done: Op completed by file system of primary storage cluster and splitter component callback has been called.
    secondary sent: Op is dispatched to secondary storage cluster and is either in transit (network) or in progress by file system of SR circuitry of secondary storage cluster.
    secondary done: Op completed by file system of secondary storage cluster and splitter component has received a completion callback.
    response sent: Op completed on both of primary and secondary storage cluster and a response is released by splitter component of SR circuitry.

A splitter component can include a queue to store incoming operations and a splitter object that is configured to split (replicate) operations targeting a storage object. The splitter object replicates the operations to a replicated storage object of the second storage cluster. Operations that been acknowledged to the client device have been executed by a storage cluster and hence committed on both primary and secondary endpoints for the primary and secondary storage clusters. However, at a given instance of time, one or more Ops could be in flight i.e., executed on neither of endpoints (e.g., first storage object hosted by primary storage cluster, replicated second storage object hosted by secondary storage cluster), both of the endpoints, or executed on one of the endpoints. As a consequence, the primary and second storage clusters at a given point in time could be divergent with respect to inflight Ops. A common snapshot may be performed periodically to serve as resynchronization points.

Data operations are designed with an idempotent property while metadata operations are designed with a non-idempotent property. To address this divergence, the present design when in a state of synchronous replication (in sync state) will persistently track inflight operations. Also, before opening up a storage object for I/O operations of a client device, the present design will replace the inflight operations prior to resuming synchronous replication.

In another example, the present design in order to maintain a secondary storage cluster as being failover capable will cause an out of sync (OOS) event for a data container/volume to be an internal event and will also avoid write order inconsistency. The present design disallows I/O operations on the OOS data container/volume until resumption of synchronous replication and this avoids dependent write order inconsistencies between the OOS data container/volume and a replicated data container/volume. The present design performs a fast establishment of a transfer engine for resynchronization and keeps the CG in sync while one or more data containers/volume in the CG having an internal event to indicate OOS.

Embodiments described herein seek to improve various technological processes associated with cross-site storage solutions and ensure the process of quickly establishing resynchronization between a storage object (e.g., a first storage object) of a primary storage cluster and a replicated storage object (e.g., a second storage object) of a secondary storage cluster. Various embodiments of the present technology provide for a wide range of technical effects, advantages, and/or improvements to stretched storage systems and participating distributed storage systems. For example, various embodiments may include one or more of the following technical effects, advantages, and/or improvements: (i) provide an Op log on a primary storage cluster and another Op log on the secondary copy. Both Op logs will specify which operations are committed on each of the storage clusters. These two Op logs can be used to find how the two filesystems are differing and carry out resynchronization; (ii) maintain the benefit of parallel splitting of Ops to primary and secondary storage clusters in synchronous replication while adding support for Op logging on both primary and secondary storage clusters; and (iii) start Op logging early and marking the Op log usable once the synchronous replication relationship between a storage object and a replicated storage object enters In Sync state. Early engagement of Op logging avoids I/O latency for a client device.

One or more of which may include various additional optimizations described further below.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to HDDs, SSDs, flash memory systems, or other storage devices. In a similar manner, cluster 145 includes multiple storage nodes 146a-n and an Application Programming Interface (API) 147. In the context of the present example, the multiple storage nodes 146a-n are organized as a cluster and provide a distributed storage architecture to service storage requests issued by one or more clients of the cluster.

The API 137 may provide an interface through which the cluster 135 is configured and/or queried by external actors (e.g., the computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
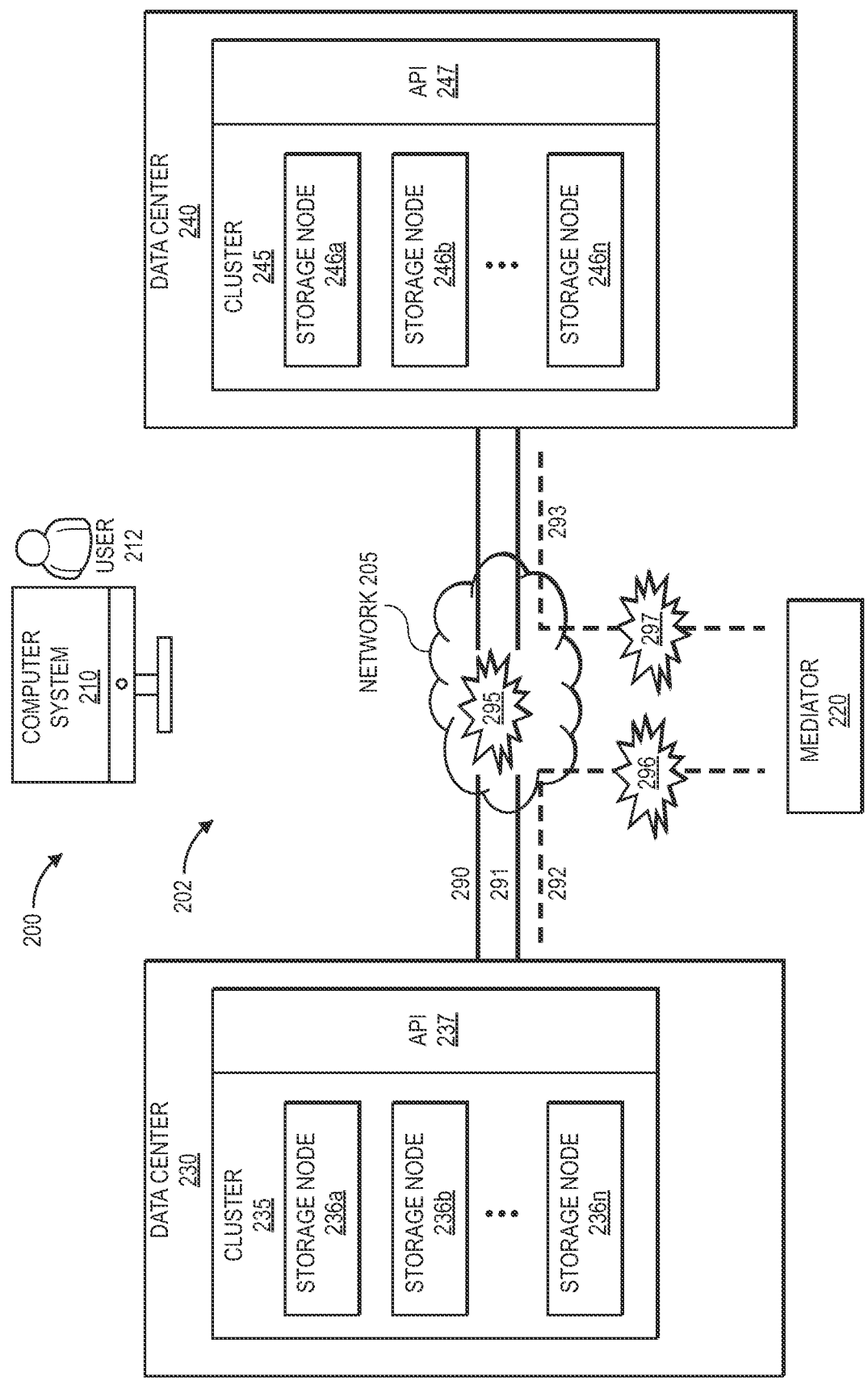
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, and optionally a mediator 220. The data centers 230 and 240, the mediator 220, and the computer system 210 are coupled in communication via a network 205, which, depending upon the particular implementation, may be a Local Area Network (LAN), a Wide Area Network (WAN), or the Internet.

The data centers 230 and 240 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230 and 240 may represent a colocation data center in which a company rents space of a facility owned by others and located off the company premises. The data centers are shown with a cluster (e.g., cluster 235, cluster 245). Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes at least two storage nodes 236a-b, optionally includes additional storage nodes (e.g., 236n) and an Application Programming Interface (API) 237. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes at least two storage nodes 246a-b, optionally includes additional storage nodes (e.g., 246n) and includes an Application Programming Interface (API) 247. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

In one example, each cluster can have up to 5 CGs with each CG having up to 12 volumes. The system 202 provides a planned failover feature at a CG granularity. The planned failover feature allows switching storage access from a primary copy of the data center 230 to a mirror copy of the data center 240 or vice versa.

Figure 3:
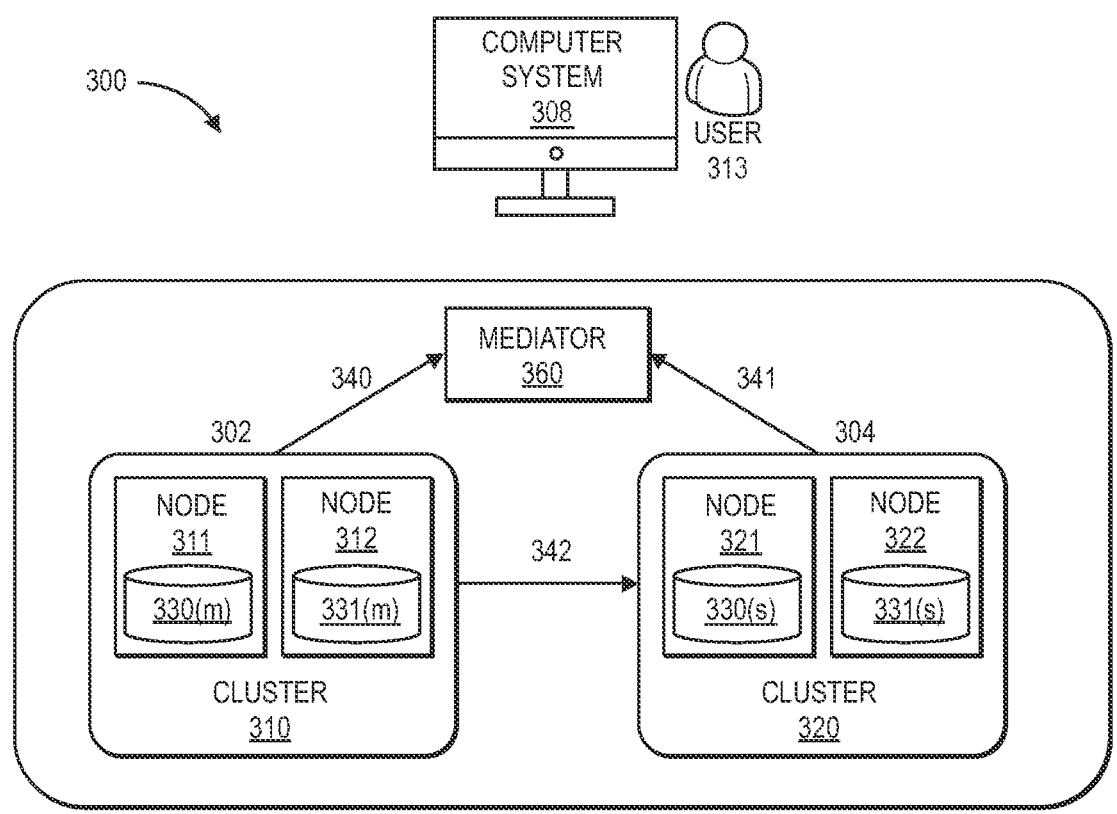
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 313) of the multi-site distributed storage system 300 or a managed service provider responsible for multiple distributed storage systems of the same or multiple customers may monitor various operations and network conditions of the distributed storage system or multiple distributed storage systems via a browser-based interface presented on computer system 308. In the context of the present example, the distributed storage system 300 includes a data center 302 having a cluster 310, a data center 304 having a cluster 320, and a mediator 360. The clusters 310, 320, and the mediator 360 are coupled in communication (e.g., communications 340-342) via a network, which, depending upon the particular implementation, may be a Local Area Network (LAN), a Wide Area Network (WAN), or the Internet. The communications 340-342 provide redundance communication channels for operations of the distributed storage system 300 (e.g., liveliness operation, consensus operation)

The cluster 310 includes nodes 311 and 312 while the cluster 320 includes nodes 321 and 322. In one example, the cluster 320 has a data copy 330 in node 321 that is a mirrored copy of data copy 330 in node 311. A data copy 331 in node 322 is a mirrored copy of the data copy 331 in node 312 to provide non-disruptive operations at all times even in the presence of failures including, but not limited to, network disconnection between the data centers 302 and 304 and the mediator 360.

The multi-site distributed storage system 300 provides correctness of data, availability, and redundancy of data. In one example, the nodes 311 and 312 are designated as a master and the nodes 321 and 322 are designated as a slave. The master is given preference to serve I/O commands to requesting clients and this allows the master to obtain a consensus in a case of a race between the clusters 310 and 320. The mediator 360 enables an automated unplanned failover (AUFO) in the event of a failure. The data copy 330 (master), data copy 331 (slave), and the mediator 360 form a three way quorum. If two of the three entities reach an agreement for whether the master or slave should serve I/O commands to requesting clients, then this forms a strong consensus.

In one embodiment, node 311 has a failure and the data copy 331 for a storage object of node 312 remains in sync. The node 312 handles a takeover operation for data copy 330 (master). Upon a volume mount time, the node 311 temporarily disallows input/output operations (e.g., both read and write) with a retriable error. The I/O operations from a computer system 308 are not allowed at node 311 until resynchronization occurs or a timeout occurs.

Next, the cluster 320 performs an automatic Fast Resynchronization (Fast Resync) to maintain zero recovery point objective (RPO) protection. The Fast Resync is based on reestablishing a Sync Data Path between data copy 330 (master) of node 311 and data copy 330 (slave) of mirrored node 321, and reconciling inflight regions based on persistent inflight tracking of I/O operations (IFT-P). The secondary storage cluster 320 can be provided with necessary information about a high availability partner to avoid cross-cluster calls between the primary and secondary storage cluster. Note, no asynchronous transfers and transition are allowed during the Fast Resync, which will establish a transfer engine session and start persistent inflight op tracking replay. A Fast Resync can be triggered as soon a storage object on the secondary storage cluster is mounted.

Subsequently, node 311 waits for resumption of synchronous replication and allows I/O upon completion of the synchronous replication.

Figure 6A:
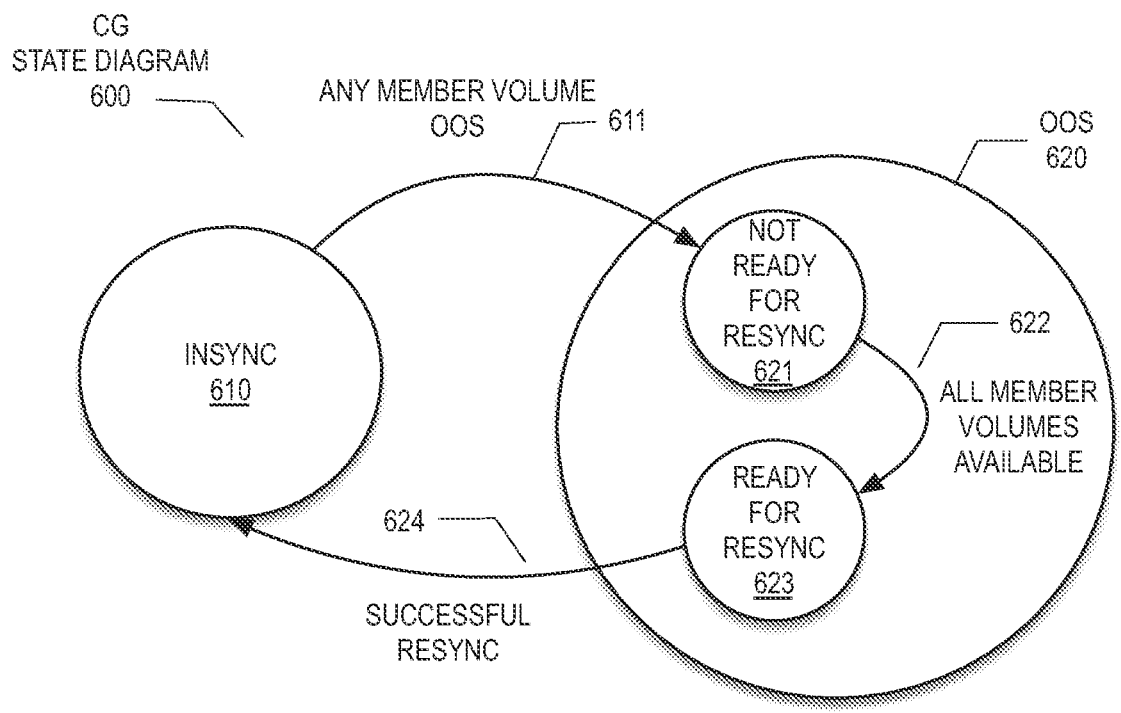
FIG. 6A is a CG state diagram in accordance with an embodiment of the present disclosure.
Figure 6B:
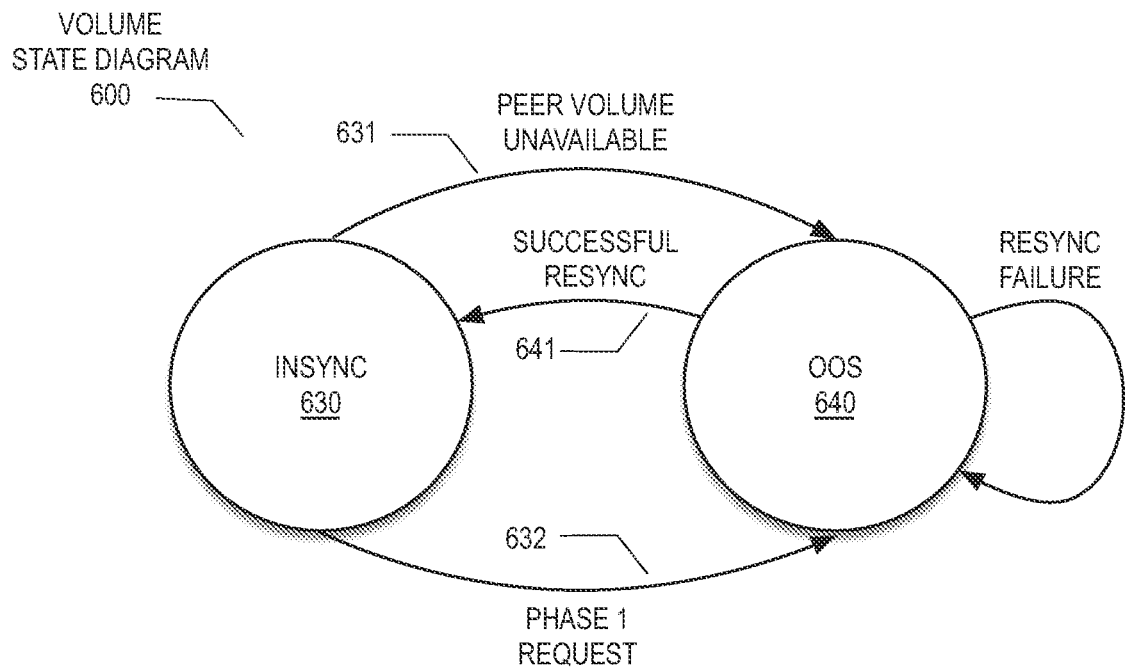
FIG. 6B is a volume state diagram in accordance with an embodiment of the present disclosure.

If Fast Resync experiences an error or failure resulting in the Fast Resync not being possible within a certain time period (e.g., 30-90 seconds, 60 seconds), then the following phases occur:

Phase 1: After expiration of the certain time period, node 311 will take a CG for node 311 out of sync (OOS). The state diagrams for the CG and a storage object (e.g., data container/volume) are illustrated in FIGS. 6A and 6B when Fast Resync has an error or failure.

Phase 2: add a strict sync policy to database software management that will disallow I/O for an extended time period or indefinite time period. Phase 1 behavior will be the default mode of operations if fast resync is not successfully performed within the certain time period.

The master and slave roles for the clusters 310 and 320 help to avoid a split-brain situation with both of the clusters simultaneously attempting to serve I/O commands. There are scenarios where both master and slave copies can claim to be a master copy. For example, a recovery post failover or failure during planned failover workflow can results in both clusters 310 and 320 attempting to serve I/O commands. In one example, a slave cannot serve I/O until an AUFO happens. A master doesn't serve I/O commands until the master obtains a consensus.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (master) while operations received by the node 321 (slave) are proxied to node 311.

Example Storage Node

Figure 4:
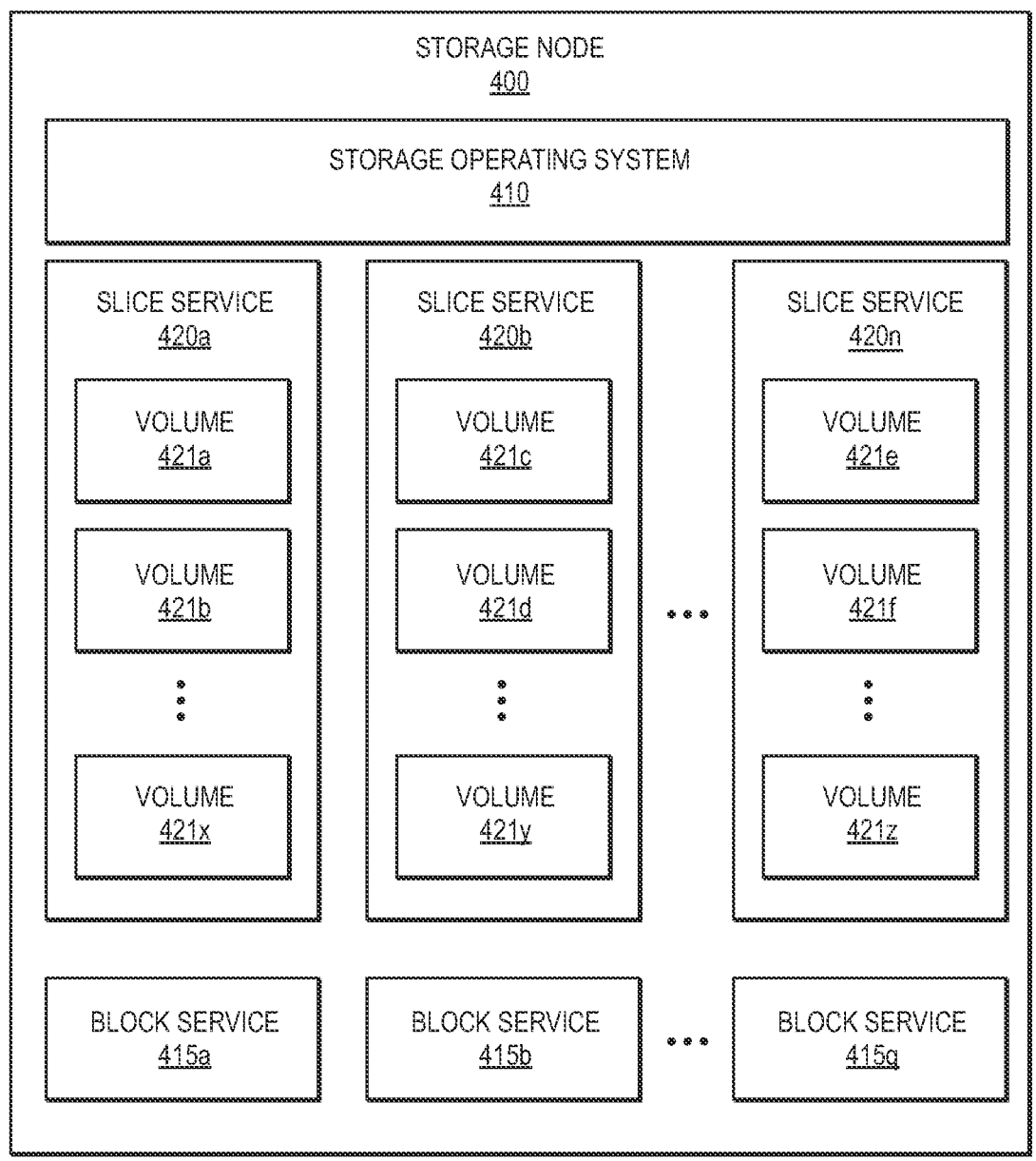
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136a-n, 146a-n, 236a-n, 246a-n, 311, 312, 331, 322, 712, 715, 752, 754) described herein. In the context of the present example, storage node 400 includes a storage operating system 410, one or more slice services 420a-n, and one or more block services 415a-q. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421a-x, volumes 421c-y, and volumes 421e-z). Client systems (not shown) associated with an enterprise may store data to one or more volumes, retrieve data from one or more volumes, and/or modify data stored on one or more volumes.

The slice services 420a-n and/or the client system may break data into data blocks. Block services 415a-q and slice services 420a-n may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420a-n may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415a-q and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Consistency Groups

Figure 5:
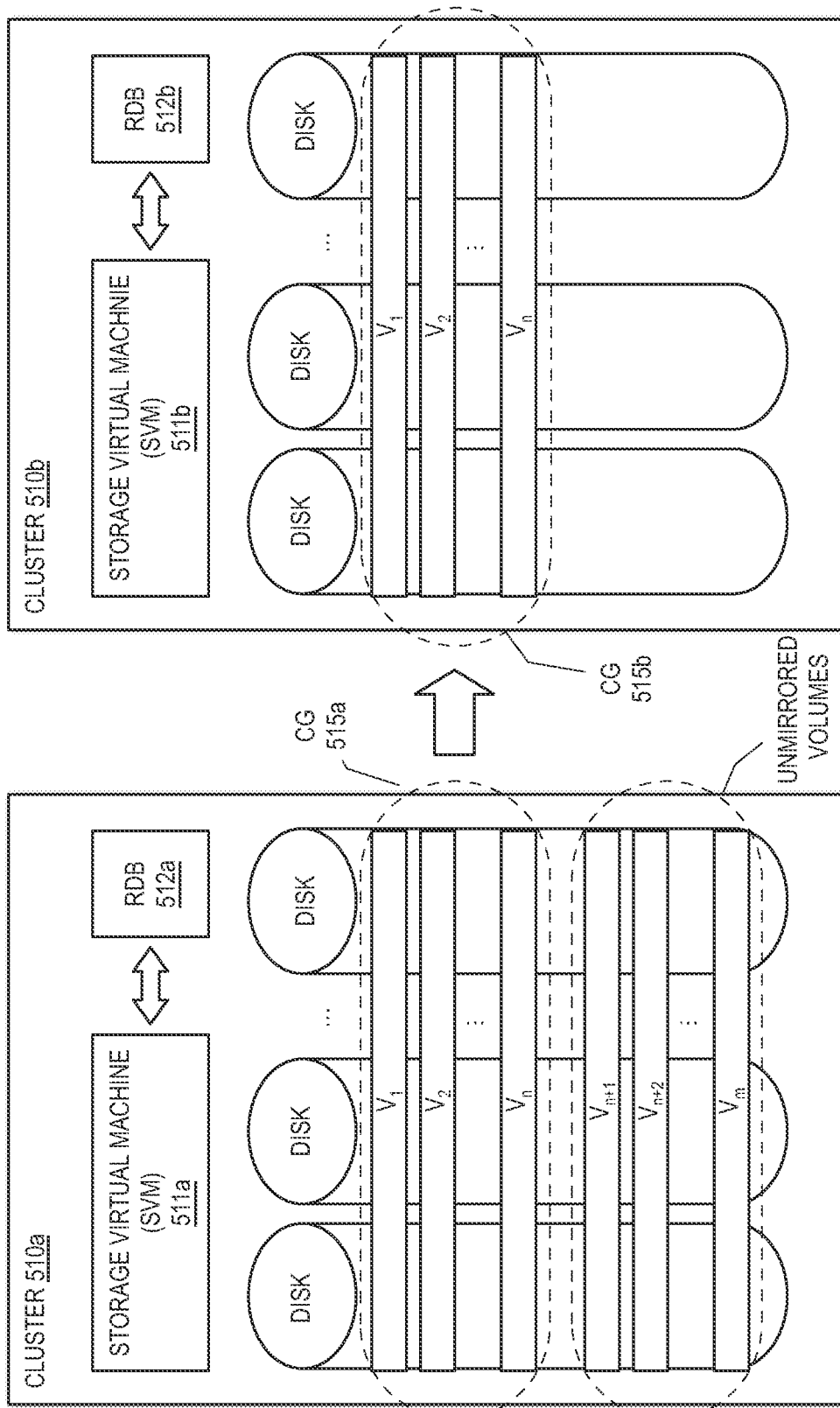
FIG. 5 is a block diagram illustrating the concept of a consistency group (CG) in accordance with an embodiment of the present disclosure.

FIG. 5 is a block diagram illustrating the concept of a consistency group (CG) in accordance with an embodiment of the present disclosure. In the context of the present example, a stretch cluster including two clusters (e.g., cluster 110a and 110b) is shown. The clusters may be part of a cross-site high-availability (HA) solution that supports zero recovery point objective (RPO) and zero recovery time objective (RTO) protections by, among other things, providing a mirror copy of a dataset at a remote location, which is typically in a different fault domain than the location at which the dataset is hosted. For example, cluster 110a may be operable within a first site (e.g., a local data center) and cluster 110b may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, and the like) may be performed at the level of granularity of a CG (e.g., CG 115a or CG 115b). A CG is a collection of storage objects or data containers (e.g., volumes) within a cluster that are managed by a Storage Virtual Machine (e.g., SVM 111a or SVM 111b) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 115a may be referred to as a local CG from the perspective of cluster 110a and as a remote CG from the perspective of cluster 110b. Similarly, CG 115a may be referred to as a remote CG from the perspective of cluster 110b and as a local CG from the perspective of cluster 110b. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 112a and 112b), which may store configuration information for their respective clusters. A configuration database provides cluster wide storage for storage nodes within a cluster. The configuration information may include relationship information specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 115b) to which data is configured to be synchronously replicated may be referred to as being in the role of a destination CG, whereas the CG (e.g., CG 115a) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a CG may be described as performing certain actions (e.g., taking other members of a CG out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of CGs associated with different clusters (e.g., from a primary or master cluster to a secondary or slave cluster), data replication may also be performed asynchronously and/or within the same cluster. Similarly, a single remote CG may protect multiple local CGs and/or multiple remote CGs may protect a single local CG. For example, a local CG can be setup for double protection by two remote CGs via fan-out or cascade topologies. In addition, those skilled in the art will appreciate a cross-site high-availability (HA) solution may include more than two clusters, in which a mirrored copy of a dataset of a primary (master) cluster is stored on more than one secondary (slave) cluster.

FIG. 6A is a CG state diagram 600 in accordance with an embodiment of the present disclosure. In the context of the present example, the data replication status of a CG can generally be in either of an InSync state (e.g., InSync 610) or an OOS state (e.g., OOS 620). Within the OOS state, two sub-states are shown, a not ready for resync state 621 and a ready for resync state 623.

While a given CG is in the InSync state, the mirror copy of the primary dataset associated with the member volumes of the given CG may be said to be in-synchronization with the primary dataset and asynchronous data replication or synchronous data replication, as the case may be, are operating as expected. When a given CG is in the OOS state, the mirror copy of the primary dataset associated with the member volumes of the given CG may be said to be out-of-synchronization with the primary dataset and asynchronous data replication or synchronous data replication, as the case may be, are unable to operate as expected. Information regarding the current state of the data replication status of a CG may be maintained in a configuration database (e.g., RDB 512a or 512b).

As noted above, in various embodiments described herein, the members (e.g., volumes) of a CG are managed as a single unit. In the context of the present example, the data replication status of a given CG is dependent upon the data replication status of the individual member volumes of the CG. A given CG may transition 611 from the InSync state to the not ready for resync state 621 of the OOS state responsive to any member volume of the CG becoming OOS with respect to a peer volume with which the member volume is peered. A given CG may transition 622 from the not ready for resync state 621 to the ready for resync state 623 responsive to all member volumes being available. In order to support recovery from, among other potential disruptive events, manual planned disruptive events (e.g., balancing of CG members across a cluster) a resynchronization process is provided to promptly bring the CG back into the InSync state from the OOS state. Responsive to a successful CG resync, a given CG may transition 624 from the ready for resync state 623 to the InSync state.

Although outside the scope of the present disclosure, for completeness it is noted that additional state transitions may exist. For example, in some embodiments, a given CG may transition from the ready for resync state 623 to the not ready for resync state 621 responsive to unavailability of a mediator (e.g., mediator 120) configured for the given CG. In such an embodiment, the transition 622 from the not ready for resync state 621 to the ready for resync state 623 should additionally be based on the communication status of the mediator being available.

FIG. 6B is a volume state diagram 650 in accordance with an embodiment of the present disclosure. In the context of the present example, the data replication status of a volume can be in either of an InSync state (e.g., InSync 630) or an OOS state (e.g., OOS 640). While a given volume of a local CG (e.g., CG 515a) is in the InSync state, the given volume may be said to be in-synchronization with a peer volume of a remote CG (e.g., CG 515b) and the given volume and the peer volume are able to communicate with each other via the potentially unreliable network (e.g., network 205), for example, through their respective LIFs. When a given volume of the local CG is in the OOS state, the given volume may be said to be out-of-synchronization with the peer volume of the remote CG and the given volume and the peer volume are unable to communicate with each other. According to one embodiment, a periodic health check task may continuously monitor the ability to communicate between a pair of peered volumes. Information regarding the current state of the data replication status of a volume may be maintained in a configuration database (e.g., RDB 512a or 512b).

A given volume may transition 631 from the InSync state to the OOS state responsive to a peer volume being unavailable. A given volume may transition 64 from the OOS state to the InSync state responsive to a successful resynchronization with the peer volume. As described below in further detail, in one embodiment, dependent write-order consistency of the mirror copy is preserved by responsive to any member volume of a given CG detecting it has gone OOS for any reason (e.g., a network failure), driving all member volumes OOS.

Fast Resynchronization

Figure 7:
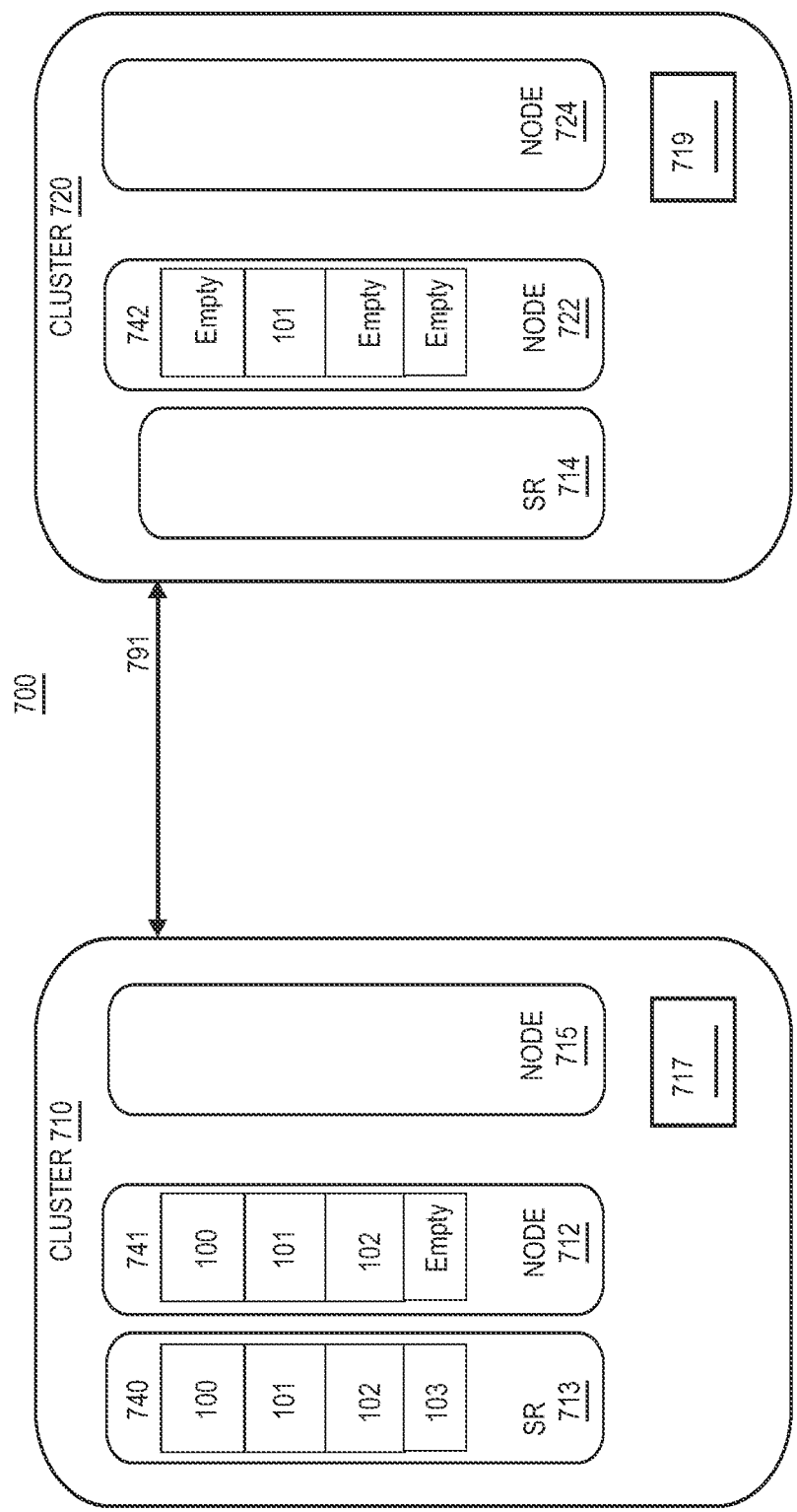
FIG. 7 is a block diagram illustrating a persistent inflight tracker that is implemented with operation (Op) logs in a distributed storage system in accordance with an embodiment of the present disclosure.

FIG. 7 is a block diagram illustrating a persistent inflight tracker that is implemented with operation (Op) logs in a distributed storage system in accordance with an embodiment of the present disclosure. In one embodiment, the distributed storage system 700 includes a primary storage cluster 710 with a primary copy of data in a consistency group (CG) that may include a subset or all volumes or data containers of a storage node. The consistency group can include volumes of nodes 712 and 715. Initially, this CG can be assigned a master role. The secondary storage cluster 720 has a mirror copy of the data in a consistency group that may include volumes of nodes 752 and 754. This CG can be initially assigned a slave role.

Each storage cluster may include a configuration database (e.g., persistent replicated database (RDB) 717, 719, RDB 512a, RDB 512b), which is available on all storage nodes of a storage cluster. Each storage cluster includes synchronization replication circuitry (SR circuitry) 713 and 714 for synchronous replication between the storage clusters.

The operation logs or journals synchronize across a filesystem from a primary storage cluster 710 having a primary copy of data and secondary storage cluster 720 having a mirror copy of the data. In the event of an Out of Sync state for a volume due to a network glitch or a node crash, etc., a mechanism is designed to protect data for the volume and its mirror copy, avoid a coordinated OOS state for other volumes within the same CG as the OOS volume, and also avoid an OOS notification from nodes of the secondary storage cluster acting as a slave to an external mediator.

Embodiments of the present disclosure provide an Op log 741 on primary copy of node 712 and another Op log 742 on the secondary copy of node 722. Both of the copies will specify which operations are committed on each of the sides of the storage clusters. These two copies can be used to find how the filesystems for each storage cluster are differing and carry out resynchronzation if necessary. Embodiments of the present disclosure eliminate design options that involve the synchronization replication circuitry (SR) components 713 and 714 directly accessing non-volatile memory contents.

In one example, persistent inflight tracking uses only In-Volume metafiles and has a minimal impact on the Op path length. A Write to metafile isn't logged in memory (e.g., non-volatile memory). Instead, a non-volatile log replay of the Op regenerates the entry in the metafile.

The SR circuitry 713 includes an active Ops log file 740 and can be implemented with a circular array. For each Op, the SR circuitry 713 specifies its view of an Inflight Op range <Head, Tail> in a message payload. Even though responses come out of order, the SR circuitry 713 waits for a head Op to be completed and frees up all consecutive Ops which are responded to next.

The various nodes (e.g., storage nodes 136a-n and storage node 400) of the distributed storage systems described herein, and the processing described below with reference to the flow diagrams of FIGS. 8-11 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 15 below.

Figure 8:
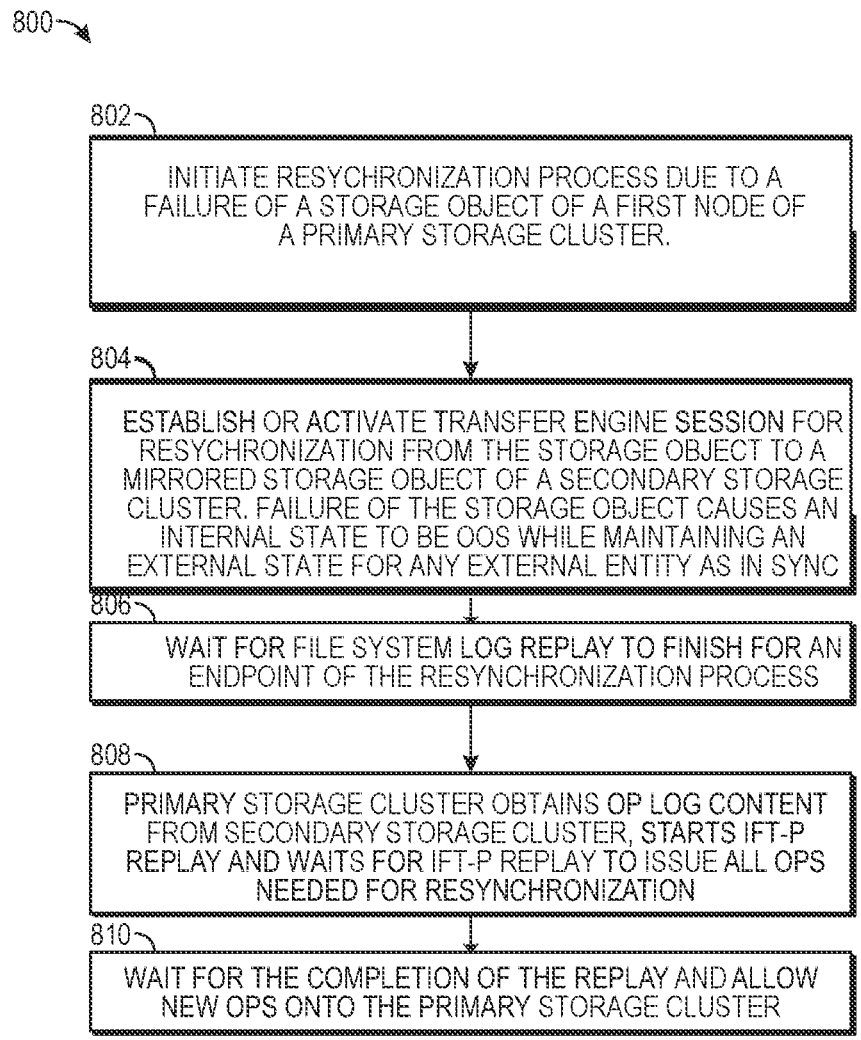
FIG. 8 is a flow diagram illustrating a set of operations for performing a persistent inflight tracking replay in accordance with an embodiment of the present disclosure.

FIG. 8 is a flow diagram illustrating a set of operations for performing a persistent inflight tracking replay in accordance with an embodiment of the present disclosure. In the context of the present example, it is assumed a peered pair of CGs, including a local CG (e.g., CG 515a) of a distributed storage system (e.g., cluster 510a) and a peered remote CG (e.g., CG 515b). One of the volumes of the local CG may have a failure and have an OOS state (e.g., OOS 620) for a period of time. Depending upon the nature of the data replication being performed (e.g., asynchronous or synchronous) and the particular implementation, a resynchronization may be performed responsive to any volume having OOS state.

State information regarding a data replication status of a mirror copy of a dataset associated with a local CG may be maintained, for example, to facilitate automatic triggering of resynchronization. For example, the state information may include information relating to the current availability or unavailability of a peer volume of a local CG.

At operation 802, computer implemented method 800 may initiate a resynchronization process due to a failure of a storage object of a first node of a primary storage cluster with the storage object becoming out of sync. A second node of the primary cluster can remain in sync state and handle operations for the first node. At operation 804, the computer implemented method establishes or activates a transfer engine session for resynchronization from the storage object to a mirrored storage object of a secondary storage cluster where a data copy of the storage object with a failure will be moved to a node of this mirrored storage object. The storage object is not allowed to process I/O operations during this failure. A connectivity loss or failure for the storage object of the first node causes an internal state of the first node and the primary storage cluster to be out of sync (OOS) while maintaining an external state for any external entity as in sync in order to provide time for the transfer engine session to be established for reestablishing synchronous replication within duration of an Op timeout. In one example, the internal state for OOS does not cause the storage object to generate an out of sync (OOS) event for processing of a mediator or external entity. The internal state of OOS is with respect to the first node and the primary storage cluster while the external state is with respect to any external entities outside of the primary storage cluster. During this internal state with OOS, no user I/O operations are allowed on the storage object that is OOS. If the mediator or a controlling external entity views the storage object as being in sync, then the secondary storage cluster is capable of handling I/O operations for an application (e.g., database application) if the primary storage cluster fails during a resynchronization.

In a different solution, for asynchronous replication between the storage object and the mirrored storage object, the storage object will generate an external OOS event that is sent to a mediator or external entity for processing. For the OOS state, an automatic failover is disallowed.

At operation 806, the computer implemented method waits for a filesystem log replay to finish for an endpoint of the resynchronization. The endpoint can be a storage object of the primary storage cluster. At operation 808, the primary storage cluster obtains content from an active Op log of a node of the secondary storage cluster, starts a persistent inflight tracker (IFT-P) replay of Ops, and waits for this replay to issue all Ops needed for resynchronization between the primary and secondary storage clusters. At operation 810, the primary storage cluster waits for completion of the IFT-P replay and allows new Ops onto the storage object of the primary storage cluster.

Figure 9:
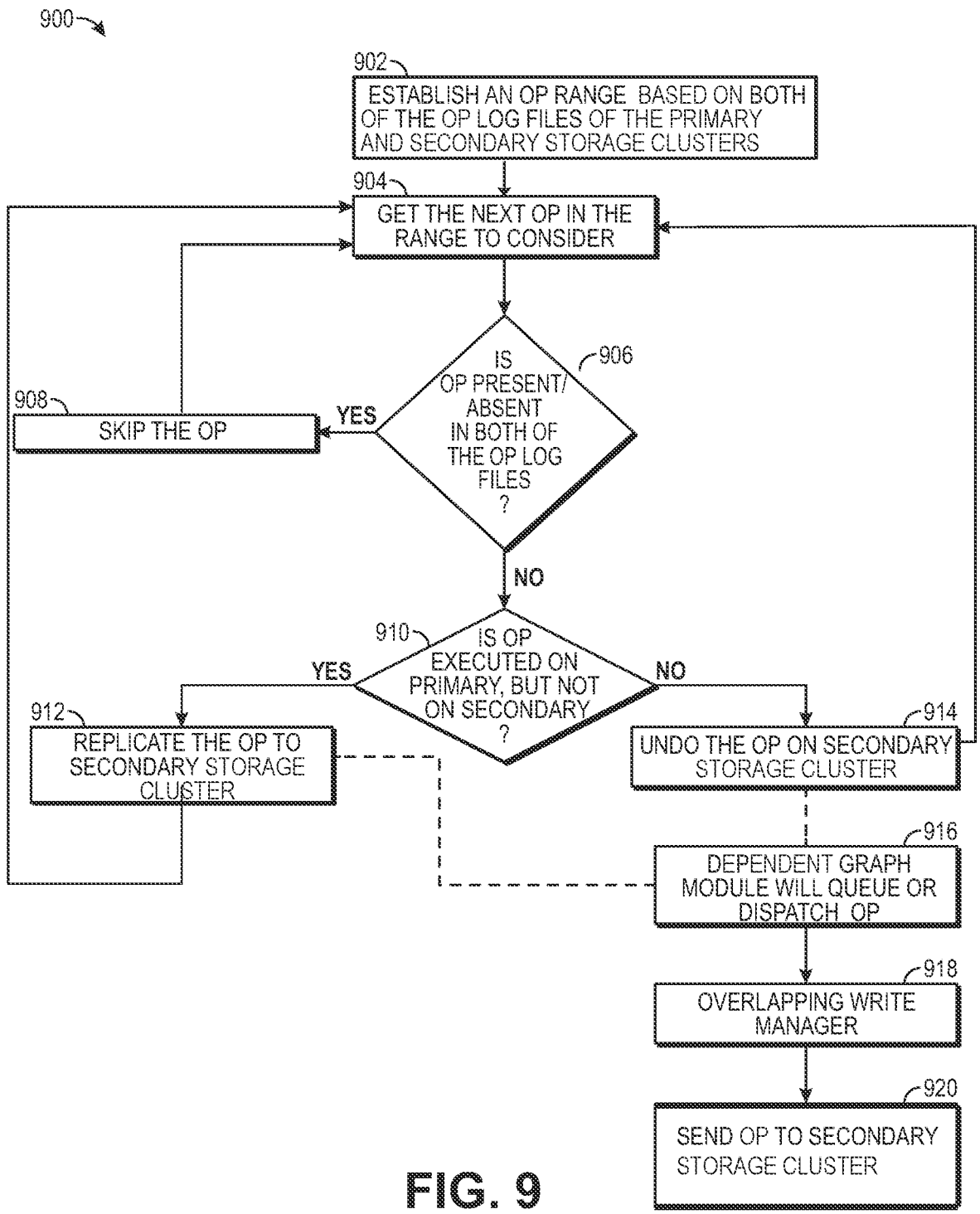
FIG. 9 is a flow diagram illustrating a set of operations for performing a persistent inflight tracking replay and reconciliation in accordance with an embodiment of the present disclosure.

FIG. 9 is a flow diagram illustrating a set of operations for performing a persistent inflight tracking replay and reconciliation in accordance with an embodiment of the present disclosure. In the context of the present example, it is assumed a peered pair of CGs, including a local CG (e.g., CG 515a) of a distributed storage system (e.g., cluster 510a) and a peered remote CG (e.g., CG 515b). One of the storage objects (e.g., files, directories, file systems, data containers, volumes, storage virtual machine) of the local CG may have a failure and have an OOS state (e.g., OOS 620) for a period of time. Depending upon the nature of the data replication being performed (e.g., asynchronous or synchronous) and the particular implementation, a resynchronization may be performed responsive to any storage object having OOS state.

At operation 902, a computer implemented method 900 establishes an Op range based on both of the Op log files from the primary and secondary storage clusters. A comparison between Op ranges of both of the Op log files from the primary and secondary storage clusters is performed to establish the Op range as discussed in conjunction with FIG. 10 below.

At operation 904, the computer implemented method obtains a next Op in the established Op range to be considered. At operation 906, the primary storage cluster determines whether the Op being considered is present or absent in both of the Op log files from the primary and second storage clusters. If the Op is present or absent in both of the Op log files from the primary and second storage clusters, then this Op is skipped at operation 908 and the method returns to operation 904 to consider a next Op.

If the Op is not present or absent in both of the Op log files, then the primary storage cluster determines if the Op is present (e.g., executed) on the primary storage cluster but not present on the secondary storage cluster at operation 910. If so, then the primary storage cluster replicates the Op to the secondary storage cluster at operation 912 and the method returns to operation 904.

If not, then the Op is undone from the secondary storage cluster by reading from the primary storage cluster and updating the Op log file of the secondary storage cluster and the method returns to operation 904 to obtain a next Op.

Operations 916, 918, and 920 may optionally occur in connection with operations 912 or 914. At operation 916, a dependent graph module will queue or dispatch an Op. At operation 918, the method includes performing a check (e.g., allocation check for allocation or allocation failure) on the Op with an overlapping write manager. At operation 920, the Op is sent to the secondary storage cluster.

Maintain the Benefit of Parallel Split of Ops to Primary and Secondary Storage Clusters in Synchronous Replication while Adding Support for Op Logging.

When operations are sequentially split such that operations are first completed on a primary storage cluster and then completed on a secondary storage cluster, the active Op Log entries at a destination will be either a subset of Op log entries at a primary storage cluster or at best be the same as the Op log entries on the primary storage cluster. In one example, establishing a range of operations to be considered for persistent inflight tracking (IFT-P) replay can be a range of Ops on the Op log of the primary storage cluster.

In case of a parallel split of operations, an incoming Op (e.g., incoming WRITE operation) is sent to a synchronization replication circuitry (SR circuitry) in a primary storage cluster and a secondary storage cluster in parallel. However, this poses challenges from an Op logging perspective:

a. A range of operations for IFT-P replay needs to be established. It is possible that a primary storage cluster is ahead of the secondary storage cluster for the processing of the operations, secondary storage cluster is ahead, or one of the primary or second storage clusters is a subset of the other storage cluster, etc.

b. Quick Reconcile (QR) procedure is invoked when a parallel split WRITE operation fails on a primary storage cluster, but succeeds on a secondary storage cluster. A quick reconcile procedure involves undoing or removing the WRITE operation on the secondary storage cluster by bringing back old data from the primary storage cluster. This can be a compound operation which may include one or more WRITES, PUNCH HOLES or both. The quick reconcile procedure needs to be Op logged to indicate its completion so that during IFT-P replay, this QR procedure is skipped if the QR procedure is already complete.

Various embodiments of the present technology provide for a wide range of technical effects, advantages, and/or improvements to stretched storage systems and participating distributed storage systems. For example, various embodiments may include one or more of the following technical effects, advantages, and/or improvements in case of a parallel split of operations:

a. The Op logs of the primary and secondary storage clusters maintain the active Op range of sequential numbers. Each Op has a unique sequence number. During IFT-P replay, the ranges from both the primary and secondary storage clusters will be used to compare and establish the range for reconciliation.

b. A QR procedure will basically modify an already logged WRITE which is being undone. A QR record will maintain subfields for WRITE and Punch Hole and number of Ops needed to complete QR. This record will be updated only by a most recent or last WRITE, and/or last Punch Hole.

Figure 10:
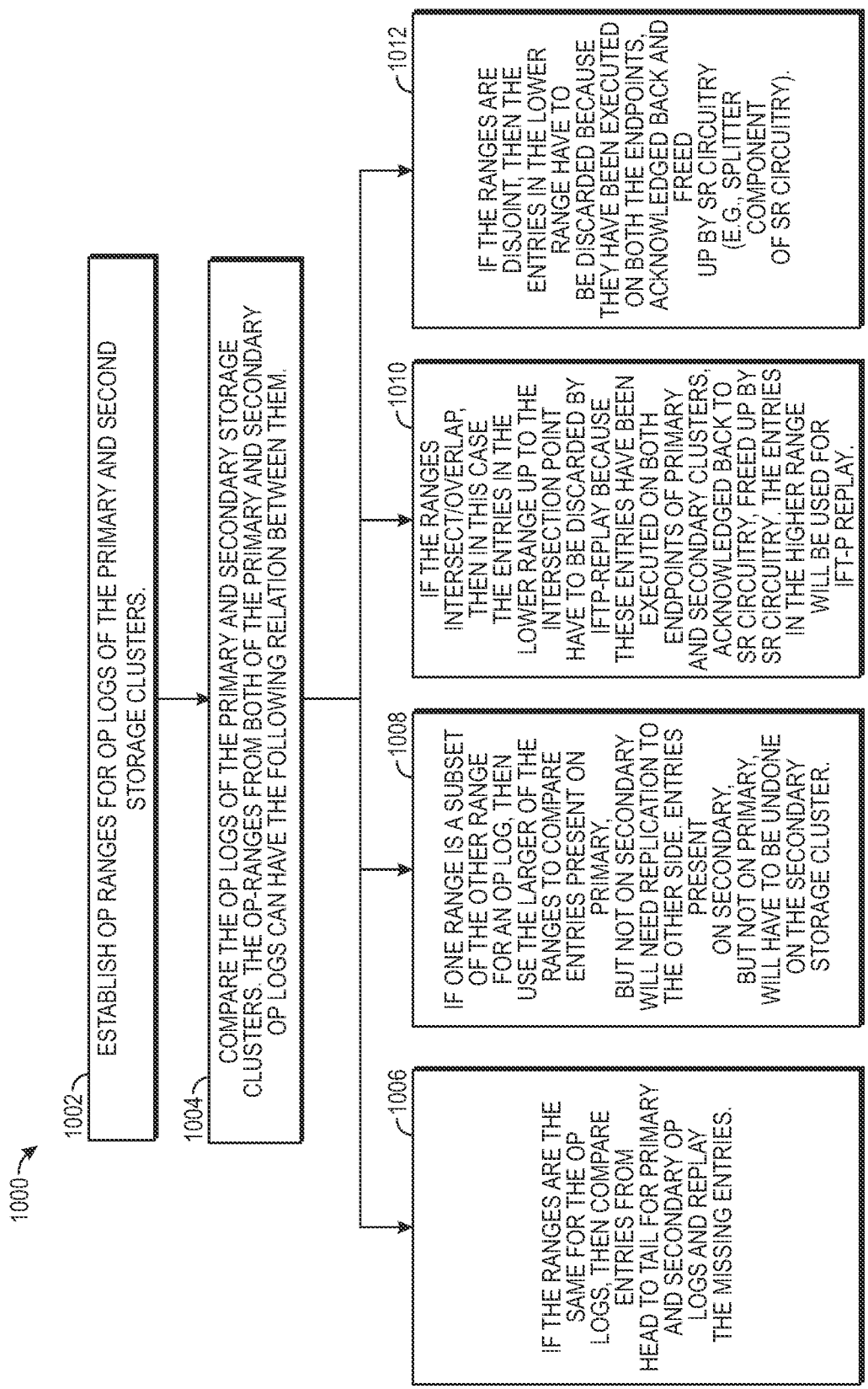
FIG. 10 is a flow diagram illustrating a set of operations for comparing ranges of Op logs for primary and secondary storage clusters while performing a persistent inflight tracking replay in accordance with an embodiment of the present disclosure.

FIG. 10 is a flow diagram illustrating a set of operations for comparing ranges of Op logs for primary and secondary storage clusters while performing a persistent inflight tracking replay in accordance with an embodiment of the present disclosure. In the context of the present example, it is assumed a peered pair of CGs, including a local CG (e.g., CG 515a) of a distributed storage system (e.g., cluster 510a) and a peered remote CG (e.g., CG 515b). One of the volumes of the local CG may have a failure and have an OOS state (e.g., OOS 620) for a period of time. Depending upon the nature of the data replication being performed (e.g., asynchronous or synchronous) and the particular implementation, a resynchronization may be performed responsive to any volume having OOS state.

State information regarding a data replication status of a mirror copy of a dataset associated with a local CG may be maintained, for example, to facilitate automatic triggering of resynchronization. For example, the state information may include information relating to the current availability or unavailability of a peer volume of a local CG.

At operation 1002, a computer implemented method 1000 establishes Op ranges for Op logs of the primary and second storage clusters.

Every Op or message that is split, will carry <HeadOpSeqNum, OpSeqNum> which basically is the SR circuitry's view of what is inflight. Both the Active Op Log of the primary storage cluster and Active Op Log of the secondary storage cluster know the <HeadOpSeqNum, TailOpSeqNum> which indicates the range of Ops that are potentially in the Log file. The Head Op Sequence Numbers indicates a first sequence number for a first Op and Tail Op Sequence Number indicates a last sequence number for a last Op within the range of Ops. Using the primary and secondary Op logs for the parallel split, it is possible to determine which Ops have to be replayed.

At operation 1004, the computer-implemented method compares the Op logs of the primary and secondary storage clusters. The Op-ranges from both of the primary and secondary Op logs can have the following relation between them:

A. If the ranges are the same for the Op logs, then at operation 1006 compare entries from Head to Tail for primary and secondary Op logs and replay the missing entries.

B. If one range is a subset of the other range for an Op log, then at operation 1008 use the larger of the ranges to Compare entries. Entries present on primary, but not on secondary will need replication to the other side. Entries present on secondary, but not on primary, will have to be undone on the secondary storage cluster.

C. If the ranges intersect/overlap, then in this case at operation 1010, the entries in the lower range up to the intersection point have to be discarded by IFTP-replay because these entries have been executed on both endpoints of primary and secondary clusters, acknowledged back to SR circuitry, freed up by SR circuitry. The entries in the higher range will be used for IFT-P replay.

D. If the ranges are disjoint, then in this case, at operation 1012, the entries in the lower range have to be discarded because they have been executed on both the endpoints, acknowledged back and freed up by SR circuitry (e.g., splitter component of SR circuitry). The entries in the range of higher sequence numbers will be used for IFT-P resync. Depending on which endpoint has the range with higher seq numbers, those may have to be replicated to secondary storage cluster or undone on the primary storage cluster.

The following are salient features of logging:
1. Every Op that is split will carry the following payload with it: OpSeqNum, HeadSeqNum as specified by SR circuitry.
2. Since independent Ops are dispatched in parallel and executed in parallel, an Op is allowed to update the <HeadOpSeqNum, TailOpSeqNum> only if the OpSeqNum is >TailOpSeqNum.
3. When an Op updates <HeadOpSeqNum, TailOpSeqNum>, only the Op with OpSeqNum==TailOpSeqNum is guaranteed to be present in the Log file. It is possible that all Ops from (TailOpSeqNum−1) till (HeadOpSeqNum) haven't been received and hence not logged. IFTP-replay will have to determine valid values from Active Op Log for replay.

In one example, an Op log file is a circular log file where an Op is inserted into Active Op Log at the index=(OpSeqNum % MaxEntries). The following examples T0 to T12 of Table 1 will clarify how range information in the Active Op Log file header will be put to use during replay: Consider Active Op Log of max size of 5 elements. Parallel split Ops don't have a suffix, sequentially split Ops will have a 'S' suffix, Lun metadata Ops have a 'L' suffix, while successful QR will have a 'Q' suffix. Each snapshot shows the contents of the Op Log files and how the entries can be used for IFTP-replay.

TABLE 1

| Index | Src op Seq # | Head, Tail | Primary Exp Op Range | Dst Op Seq# | Head, Tail | Secondary, Exp Op Range | Inference |
|---|---|---|---|---|---|---|---|
| T0: Splitter has dispatches Ops 1-5, destination (dst) receives 2-3, source (src) receives 4 |
| I1 | # | H | <1-4> | # | H | <1-3> | One Op range is a subset of |
| I1 | # | H | <1-4> | # | H | <1-3> | the other Op range. |
| I2 | # | | | 2 | | | The IFT-P can run on the |
| I3 | # | | | 3 | T | | super set range of Ops <1-4> |
| I4 | 4 | T | | # | | | and carry out replay: |

TABLE 1-continued

| Index | Src op Seq # | Head, Tail | Primary Exp Op Range | Dst Op Seq# | Head, Tail | Secondary, Exp Op Range | Inference |
|---|---|---|---|---|---|---|---|
| I5 | # | | | # | | | <2-3> will be undone on the secondary. <4> will be applied to secondary. |

T1: Splitter dispatches no more Ops, src receives all 5, dst receives all but Op 1

| Index | Src op Seq # | Head, Tail | Primary Exp Op Range | Dst Op Seq# | Head, Tail | Secondary, Exp Op Range | Inference |
|---|---|---|---|---|---|---|---|
| I1 | 1 | H | 1-5 | # | H | <1-5> | The ranges are the same. |
| I2 | 2 | | | 2 | | | The IFT-P resync will run on |
| I3 | 3 | | | 3 | | | the range of 1-5. |
| I4 | 4 | | | 4 | | | 1 is applied to secondary. |
| I5 | 5 | T | | 5 | T | | |

T2: The dst received Op1 and executed it.

| I1 | 1 | H | 1-5 | 1 | H | 1-5 | The ranges are the same. |
| I2 | 2 | | | 2 | | | The IFT-P resync will run on |
| I3 | 3 | | | 3 | | | the range of 1-5. |
| I4 | 4 | | | 4 | | | |
| I5 | 5 | T | | 5 | T | | |

T3: Splitter has freed up 1-4, has dispatched 6, 7, 8, 9. Dst receives only 9. Src hasn't received any

| I1 | 1 | H | <1-5> | stale-1 | | <5-9> | The dst range has moved |
| I2 | 2 | | | stale-2 | | | forward. Skip 1-4. IFT-P |
| I3 | 3 | | | stale-3 | | | replay will run on range of |
| I4 | 4 | | | 9 | T | | 5-9. |
| | | | | | | | 11-13 are expected to have |
| I5 | 5 | T | | 5 | H | | Ops 6, 7 and 8, but 11-13 don't. Therefore, the 3 entries will be skipped during IFT-P replay. 9 will be undone on secondary. |

T4: Src receives 6, 7, 8, 9. Dst receives 6, 7, 8

| I1 | 6 | | <5-9> | 6 | | I5-I4 | The dst range and the src |
| I2 | 7 | | | 7 | | Ops<5-9> | range are the same. IFT-P |
| I3 | 8 | | | 8 | | | resync will be carried out on |
| I4 | 9 | T | | 9 | T | | range Op5-Op9. |
| I5 | 5 | H | | 5 | H | | |

T5: splitter receives acks for 5, 6, 7, 8, 9. dispatches only 10. Dst receives it, src doesn't yet

| I1 | 6 | | I5-I4 | stale-6 | | I5-I5 | The dst range has moved |
| I2 | 7 | | Ops<5-9> | stale-7 | | Ops<10-10> | ahead. Op5-Op9 will be |
| I3 | 8 | | | stale-8 | | | discarded by IFTP-resync, but |
| I4 | 9 | T | | stale-9 | | | only Op10 will be considered |
| I5 | 5 | H | | 10 | H, T | | and it will be undone at the secondary. |

T6- src receives 10

| I1 | stale-6 | | 15-15 | stale-6 | | 15-15 | There is only one Op 10 to be |
| I2 | stale-7 | | Ops<10-10> | stale-7 | | Ops<10-10> | reconciled. IFT-P resync uses |
| I3 | stale-8 | | | stale-8 | | | that range. |
| I4 | stale-9 | | | stale-9 | | | |
| I5 | 10 | H, T | | 10 | H, T | | |

T7: Seq split MD Ops 11, 12 are executed on primary, A parallel-split independent Op 13 is dispatched. 13 is received on dst, but not on src

| I1 | 11S | H | <I1-I2> | stale-6 | H | <I1-I3> | The super-set range Op11- |
| I2 | 12S-Dep-11 | T | Ops<11-12> | stale-7 | | Ops<11-13> | Op13 will be used by IFT-P |
| I3 | stale-8 | | | 13 | T | | resync. |
| I4 | stale-9 | | | stale-9 | | | Op11, Op12 will be replicated |
| I5 | stale-10 | | | stale-10 | | | to secondary. Op13 will be undone on the secondary. |

T8: The MD Ops of 11, 12 are executed on both the endpoints. 13 is executed on src.

| I1 | 11S | H | <I1-I3> | 11S | H | <I1-I3> | The ranges in the common set |
| I2 | 12S-Dep-11 | | Ops<11-13> | 12S | | Ops<11-13> | (11-13) will be used by IFT-P |
| I3 | 13 | T | | 13 | T | | resync. |
| I4 | stale-9 | | | stale-9 | | | |
| I5 | stale-10 | | | stale-10 | | | |

T9 Splitter receives ack for 11, 12, 13 and dispatches an independent Op of 14, Lun Metadata Op 15 which only the src has executed, but not dst yet

| I1 | stale-11S | | 14-15 | stale-11S | H | <I1-I3> | The ranges Op 14-15 will be |
| | | | Ops<14-15> | | | Ops<11-13> | used for IFTP-replay while |
| I2 | stale-12S-Dep-11 | | | stale-12S-Dep-11 | | | discarding the older range of Op11-13. |
| I3 | stale-13 | | | stale-13 | T | | |
| I4 | 14 | H | | stale-9 | | | |
| I5 | 15-LS | T | | stale-10 | | | |

TABLE 1-continued

| Index | Src op Seq # | Head, Tail | Primary Exp Op Range | Dst Op Seq# | Head, Tail | Secondary, Exp Op Range | Inference |
|---|---|---|---|---|---|---|---|
| | | | T10: 14, 15-LS are received at dst. | | | | |
| I1 | stale-11S | | Ops<14-15> | stale-11S | | Ops<14-15> | The ranges 14-15 will be used for IFT-P replay. |
| I2 | Stale-12S-Dep-11 | | | Stale-12S-Dep-11 | | | |
| I3 | stale-13 | | | Stale-13 | | | |
| I4 | 14 | H | | 14 | H | | |
| I5 | 15-LS | T | | 15-LS | T | | |
| | | T11: Splitter receives ack for 14, 15-LS; sends WRITEs 16 which goes through a QR, 17 which fails at both the end-points | | | | | |
| I1 | stale-11S | | Ops<14-15> | 16Q | H, T | Op<16-16> | The range 16-16 will be used for IFT-P replay. Ops <14-15> will be skipped. Since 16 is already done with QR, it will be skipped too. |
| I2 | Stale-12S-Dep-11 | | | stale-12S-Dep-11 | | | |
| I3 | stale-13 | | | Stale-13 | | | |
| I4 | 14 | H | | Stale-14 | | | |
| I5 | 15-LS | T | | Stale-15-LS | | | |
| | | T12: Splitter has received acks for both 16, 17. Now it issues 18S which has executed on primary, but not on secondary | | | | | |
| I1 | Stale-11S | | Ops<18-18> | 16Q | H, T | Op<16-16> | The range 18-18 will be used for IFT-P replay. Op 18 will be replicated to dst. |
| I2 | Stale-12S-Dep-11 | | | Stale-12S-Dep-11 | | | |
| I3 | 18S | H, T | | Stale-13 | | | |
| I4 | Stale-14 | | | Stale-14 | | | |
| I5 | Stale-15-LS | | | Stale-15-LS | | | |

OR Procedure

Quick reconcile is an undo of the write at the secondary storage cluster because a write Op failed on the primary storage cluster. The undo occurs via a read Op of the old content at the secondary storage cluster. Since the undo is completed at end of QR, its completion needs to be recorded. The record at the secondary storage cluster can be deleted or mark the earlier recorded Op as QR.

Consider a case where a successful QR is followed by a delete of the LUN or truncate of the LUN. In such a case, QR induced read Op is taught to deal with this failure. Instead, logging QR avoids IFT-P replay from repeating a QR, which is intuitive and maintenance friendly.

During an IFT-P replay, write Ops which are committed only onto the secondary storage cluster will have to be undone by reading from primary and applying the same to secondary storage cluster. This is very much like a QR which is encountered during the steady state. Like in the steady state, the undo will read the old data from primary storage cluster and apply the same at the secondary storage cluster. The Op will be logged in Op log of the secondary storage cluster as a successful completed QR like in the steady state.

Early Engagement of Op Logging while Marking the Op Log File Usable Later to Avoid User IO Latency Op logging is relevant when the primary and secondary storage clusters are in sync state of replication. If Op logging is implemented by pausing all I/O just before entering in sync state, start Op logging and resume user I/O, then this will cause a spike in user I/O latency. The present design maintains the benefit of a transition state while adding Op logging support.

Figure 11:
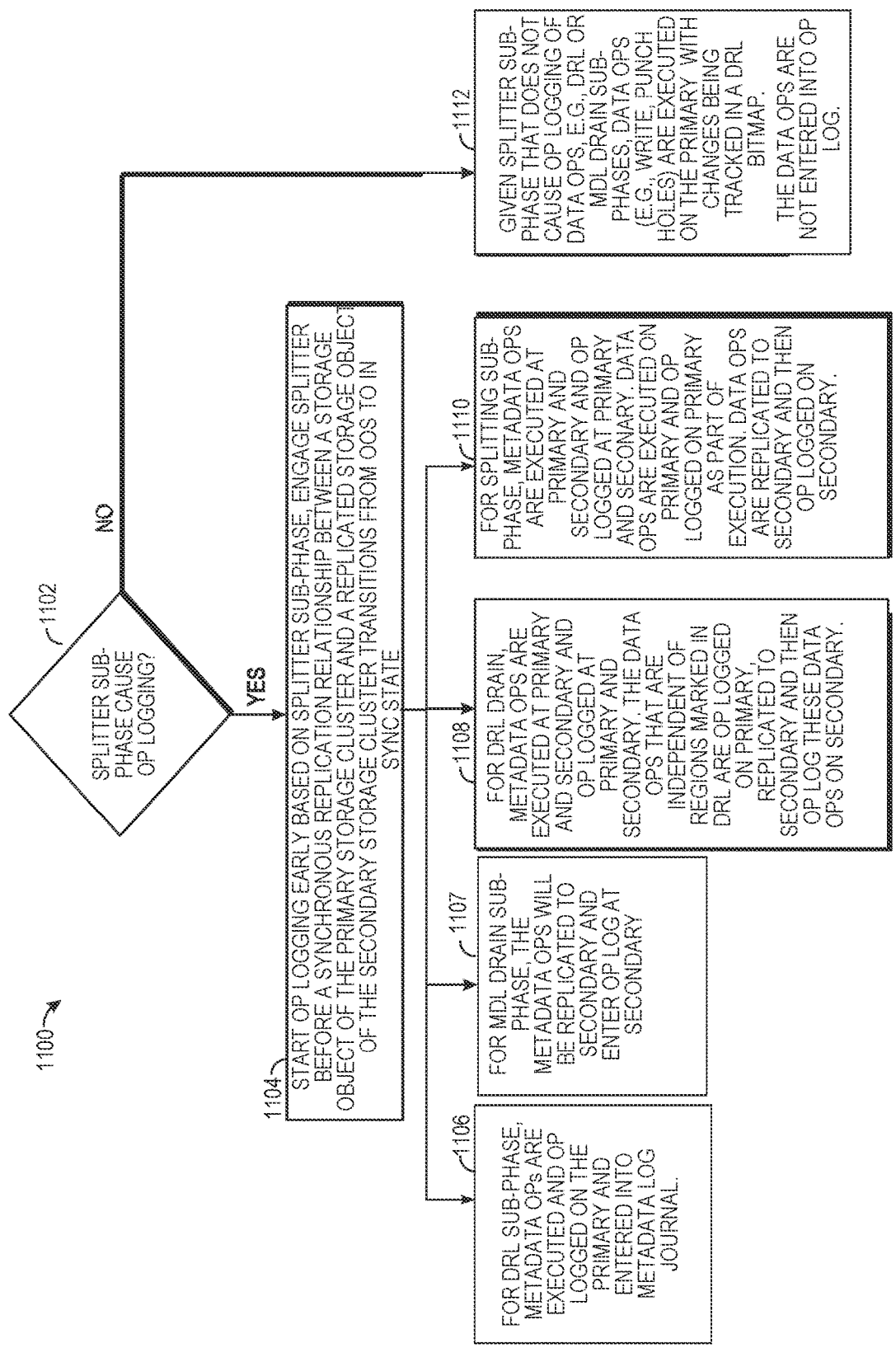
FIG. 11 is a flow diagram illustrating a set of operations for early engagement of Op logs for primary and secondary storage clusters while marking the Op log file usable later to reduce user I/O latency in accordance with an embodiment of the present disclosure.

FIG. 11 is a flow diagram illustrating a set of operations for early engagement of Op logs for primary and secondary storage clusters while marking the Op log file usable later to reduce user I/O latency in accordance with an embodiment of the present disclosure. In the context of the present example, it is assumed a peered pair of CGs, including a local CG (e.g., CG 515a) of a distributed storage system (e.g., cluster 510a) and a peered remote CG (e.g., CG 515b). One of the storage objects of the local CG may have a failure and have an OOS state (e.g., OOS 620) for a period of time. Depending upon the nature of the data replication being performed (e.g., asynchronous or synchronous) and the particular implementation, a resynchronization may be performed responsive to any storage object having OOS state at least as an internal event.

State information regarding a data replication status of a mirror copy of a dataset associated with a local CG may be maintained, for example, to facilitate automatic triggering of resynchronization. For example, the state information may include information relating to the current availability or unavailability of a peer storage object of a local CG.

A splitter component of SR circuitry goes through various sub-phases to allow a smooth transition from async replication to sync replication. Depending on the sub-phase, a decision for Op logging or no Op logging will occur. The following table 2 explains the various sub-phases of the splitter component for transitioning from async replication to sync replication.

| Sub-phase | Op logging for Metadata Ops | Op logging for data Ops |
|---|---|---|
| DRL sub-phase | Metadata Ops are Op logged on a primary storage cluster and also enter a Metadata log (MDL) journal. | Data Ops are not Op logged on the primary storage cluster. The data Ops execute on the primary storage cluster with changes being tracked in a DRL bitmap. |

-continued

| Sub-phase | Op logging for Metadata Ops | Op logging for data Ops |
|---|---|---|
| MDL Drain sub-phase | Ops from the MDL journal are replicated to the secondary storage cluster. These Ops now Op log at secondary storage cluster. | Data Ops are not Op logged on primary storage cluster. The data Ops execute on primary storage cluster with changes tracked in DRL bitmap. |
| DRL drain sub-phase | Metadata Ops are executed on primary storage cluster and Op logged at primary storage cluster. Metadata Ops are replicated to secondary storage cluster and Op logged at the secondary storage cluster. | Data Ops which are independent of objects tracked in DRL are executed on primary storage cluster and Op logged at the primary storage cluster. The data Ops are replicated to secondary storage cluster and Op logged at the secondary storage cluster. |
| Splitting sub-phase | Metadata Ops are executed at primary and secondary storage clusters and Op logged at primary and secondary storage clusters. | Data ops are executed at primary and secondary storage clusters and Op logged at primary and secondary storage clusters. |

FIG. 11 illustrates the various sub-phases of the splitter component.

At operation 1102, a computer implemented method 1100 determines whether a sub-phase (e.g., dirty region logging (DRL) sub-phase, MDL drain sub-phase to drain metadata log, DRL drain phase sub-phase (also referred to as cut over split phase), splitting sub-phase) of a splitter component causes Op logging. If so, then at operation 1104 the method starts Op logging early and engages the splitter component of SR circuitry before a synchronous replication relationship between a storage object of the primary storage cluster and a replicated storage object of the secondary storage cluster transitions from OOS state to in sync state. After the splitter component is engaged and before the synchronous replication relationship enters in sync state, the following can happen to incoming Ops depending on the sub-phase of the splitter component.

At operation 1106, for DRL sub-phase, metadata Ops (e.g., Create, Link, Unlink, Rename, Set Attribute, Open, Close) are executed and op logged on the primary storage cluster and entered into a metadata log (MDL) journal of the primary storage cluster. At operation 1107, for a MDL drain sub-phase to drain metadata log, these metadata Ops from the MDL journal will be replicated later to secondary storage cluster by metadata scan process and enter Op log at the secondary storage cluster.

At operation 1108, for a DRL drain sub-phase, metadata Ops are executed on primary storage cluster and replicated to secondary storage cluster as well. The metadata Ops are logged into Op log of primary storage cluster and replicated Ops enter Op log of secondary storage cluster as well. For DRL drain, the data ops that are independent of the regions marked in DRL and independent of DRL scan will be Op logged on the primary storage cluster. The data ops are replicated to secondary storage cluster when replication occurs and then Op log these data Ops on secondary storage cluster.

At operation 1110, for a splitting sub-phase, metadata Ops are executed at primary and secondary storage clusters and Op logged at primary and secondary storage clusters. Data ops are executed at primary and secondary storage clusters and Op logged at primary and secondary storage clusters.

At operation 1112, given a splitter sub-phase that does not cause Op logging of data Ops, for DRL or MDL drain sub-phases, data Ops (e.g., write, punch holes) are executed on the primary storage cluster with changes being tracked in a DRL bitmap. The data Ops are not logged into the Op log of the primary storage cluster.

A dirty region log is used to track regions within the storage object that are modified by data operations, such as write operations executed during a last incremental transfer. The dirty region log may comprise bits that can be set to either a dirty indicator or a clean indicator. A bit may be mapped to a region within the storage object. Thus, the bit can be set to the dirty indicator to indicate that a data operation has modified the region (e.g., the region now comprises data not yet replicated to the replicated storage object). The bit can be set to the clean indicator to indicate that the region is now clean (e.g., the region has not been modified with data not yet replicated to the replicated storage object, and thus the region comprises the same data as a corresponding region within the replicated storage object).

The computer implemented method marks the Op log usable once the synchronous replication relationship between a storage object of a primary storage cluster and a replicated storage object of a secondary storage cluster enters in sync state.

Although the operations in the computer-implemented methods disclosed herein are shown in a particular order, the order of the actions can be modified. Thus, the illustrated embodiments can be performed in a different order, and some operations may be performed in parallel. Some of the operations listed in the methods disclosed herein are optional in accordance with certain embodiments. The numbering of the operations presented is for the sake of clarity and is not intended to prescribe an order of operations in which the various operations must occur. Additionally, operations from the various flows may be utilized in a variety of combinations.

In one example, the operations 1106, 1107, 1108, and 1108 are illustrated as separate parallel operations. In another example, these operations can occur sequentially such as operation 1107 being performed after operation 1106.

Maintain the Benefits of Transition State while Coming to in Sync State

It would be trivial to start Op Logging while only in the In Sync state for a synchronous replication relationship between a storage object (e.g., a first storage object) of the primary storage cluster and a replicated storage object (e.g., a second storage object) of the secondary storage cluster. Conventional techniques for transitioning from asynchronous replication to synchronous replication must pause client I/O (e.g., stop, block, fail, or queue the client I/O for later execution), which increases latency (e.g., increased latency while the client I/O is queued). This also affects the operation of client devices accessing data within the existing volume (e.g., an application may timeout or experience errors when data access operations, attempting to access data, are blocked or failed).

Accordingly, methods and/or systems are provided herein that can transition a storage object from an asynchronous replication state or other non-synchronous state (e.g., an out of sync state) to a synchronous replication state in a manner that mitigates client disruption and latency. However, this will need an explicit differentiation between transition state and the In Sync state and this can cause a latency spike in the user I/O into a transition state. Thus, the method 1100 starts Op logging early and marks the Op Log as usable once the synchronous replication relationship enters into the In Sync state.

A metadata log replay can play Ops out of order at destination from an Op Log seq number point of view.

Figure 12:
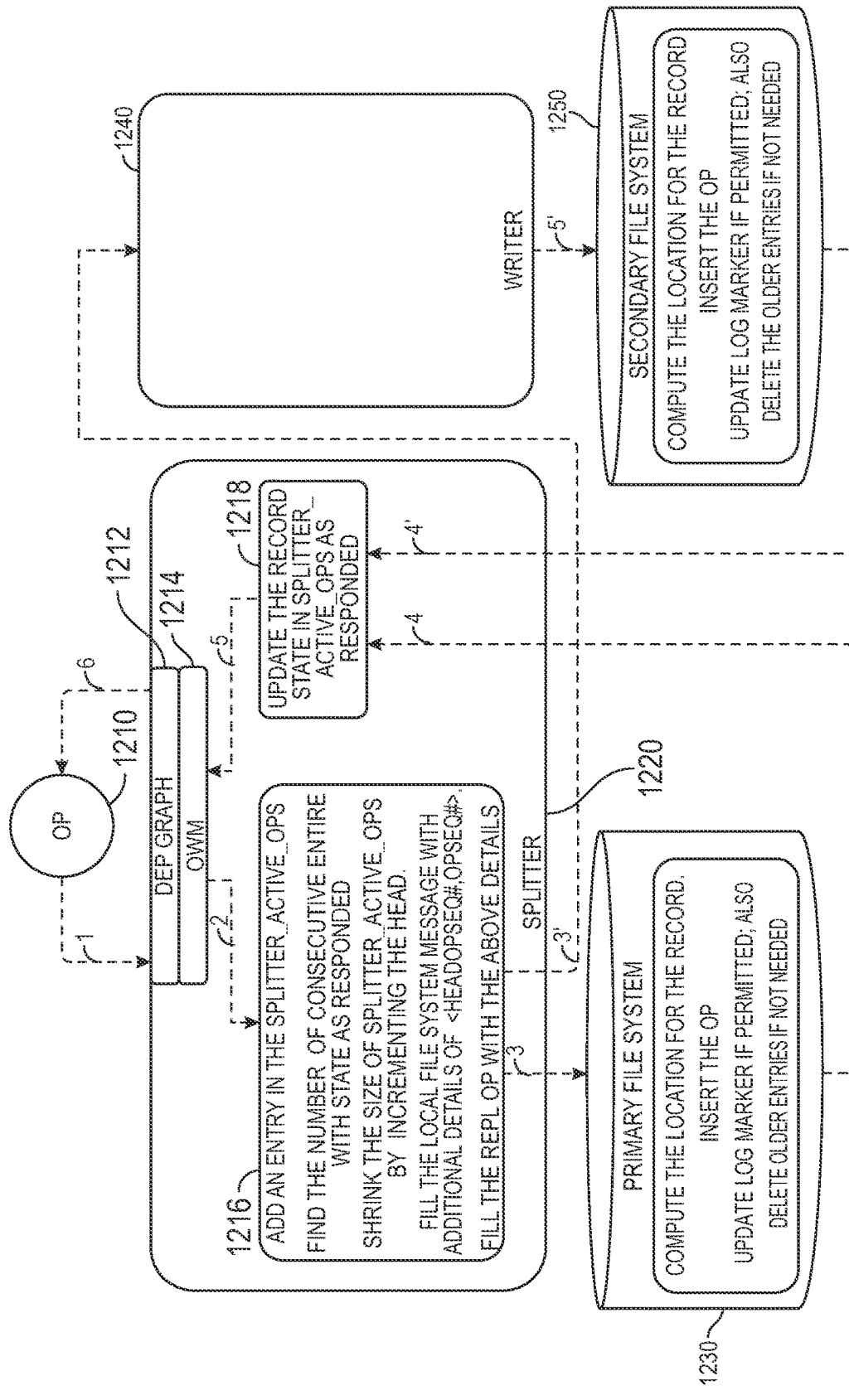
FIG. 12 illustrates a synchronous replication (SR) system with tracker updates for a transition or resynchronization process in accordance with one embodiment.

FIG. 12 illustrates a synchronous replication (SR) system with tracker updates for a transition or resynchronization process in accordance with one embodiment. The SR system 1200 includes a splitter component 1220 and a primary file system 1230 that are located in a primary storage cluster while a writer 1240 and a secondary file system 1250 are located in a secondary storage cluster. At operation 2, an Op 1210 is queued in a queue 1216 of splitter component 1220 after being sent to dependent graph at operation 1 and then passing (or failing) dependent graph 1212 and overlapping write manager 1214 checks. An entry for the Op is added to the queue 1216. The splitter component 1220 will determine a number of consecutive entries with state as responded, shrink a size of splitter active Ops by incrementing a head, fill a local file system message with additional details of <Head Op Seq #, Op Seq #>, and fill a replicated Op with the above details. Next, the Op is sent to the file system 1230 at operation 3, and the file system 1230 computes a location for a record of the Op, inserts the Op, updates a log marker if permitted, and deletes any older entries in the Op log of the primary storage cluster if these entries are not needed.

Subsequently, at operation 4, the splitter component 1220 using module 1218 will update the record state in splitter active Ops as responded for the Op.

At operation 3' the replicated Op is sent to writer 1240 to be executed on a replicated storage object. The replicated Op is provided into a record of file system 1250, which also computes a location for a record of the replicated Op, inserts the replicated Op, updates a log marker if permitted, and deletes any older entries in the Op log if these entries are not needed. At operation 4', the splitter component 1220 will update the record state in splitter active Ops as responded for the replicated Op. Responses for operations 5 and 6 complete the transition or resynchronization process.

It is important to assign sequence numbers after Dependent Graph and Overlapping Write Manager checks have been cleared. The following example highlights the reason by showing what happens if the above rule wasn't followed:

1. Consider two operations truncate of F1, expand of F1 coming in from two different threads.
2. If the above rule was not followed and seq numbers 1 was assigned to Truncate and 2 for expand before even they went through Dependent Graph checks.
3. If the actual order of execution on a filesystem (e.g., write anywhere file system (WAFL)) was Seq 2 and Seq 1, then the Ops are logged in Op Log of the primary storage cluster. The result of the above Ops at the primary storage cluster is that the file is truncated.
4. Consider if the secondary storage cluster crashes before either of the Ops could be executed on it.
5. IFT-P replay will try to replicate Ops in the order Seq 1 and then Seq 2 (different order than actual order of execution on a filesystem). The result at secondary storage cluster is an expanded file. Thus, the primary and secondary storage clusters have different resulting files if sequence numbers are not assigned after Dependent Graph and Overlapping Write Manager checks have been cleared.

Light-Weight Op Logging

Figure 13:
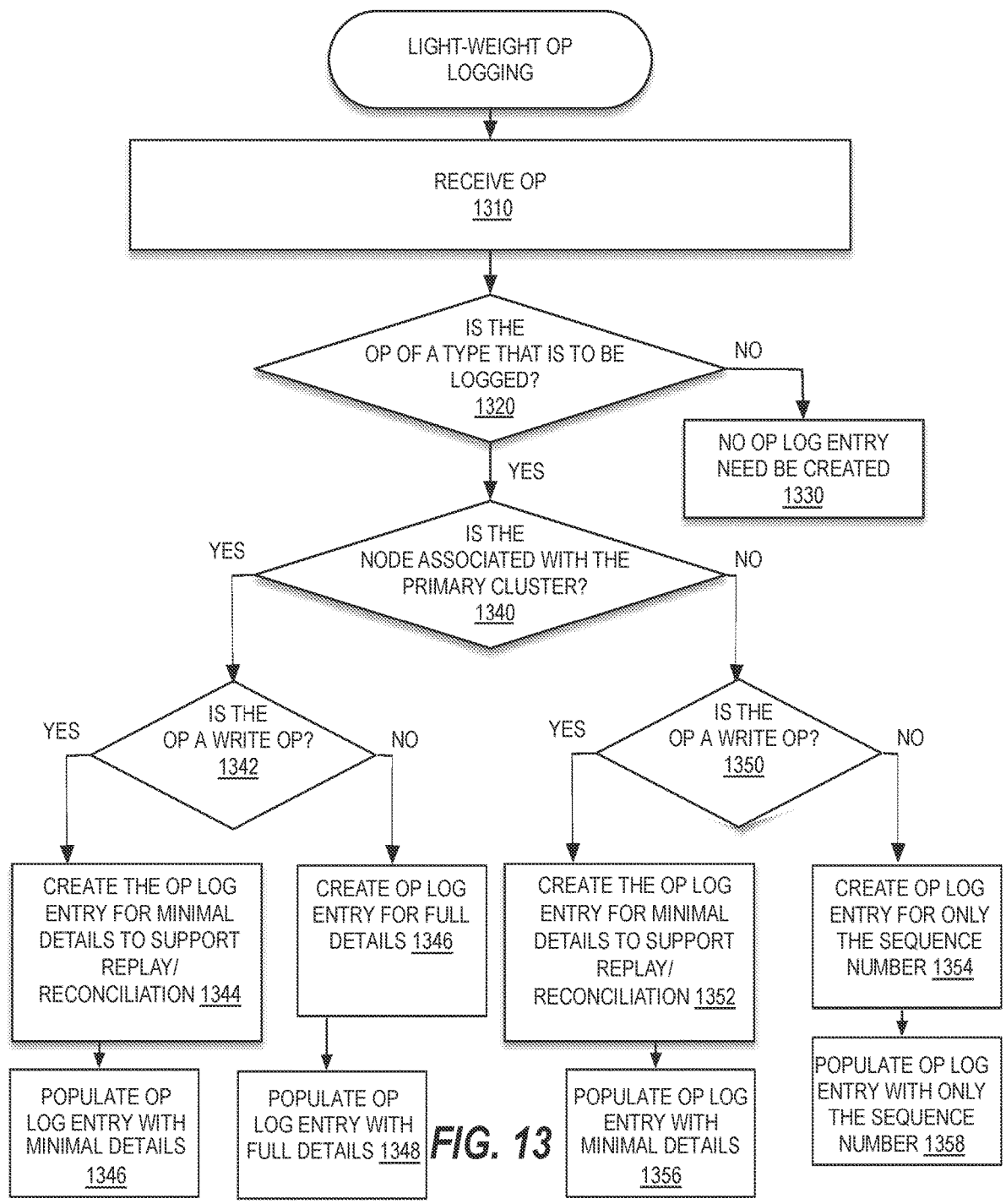
FIG. 13 is a flow diagram illustrating a set of operations for performing light-weight Op logging in accordance with one embodiment.

FIG. 13 is a flow diagram illustrating a set of operations for performing light-weight Op logging in accordance with one embodiment. In various embodiments described herein Op Logs (e.g., OP Log 741 and 742) may be maintained in the form of in-volume metafiles by a node (e.g., a monarch node) of the respective cluster. Within a particular CG one volume may be considered the monarch volume. The node within the cross-site HA storage solution that hosts the monarch volume may be considered the monarch node. For purposes of clarifying the difference between a master node and a monarch node, in various embodiments, there may be one master node per distributed storage system and one monarch node per CG.

The operations of computer-implemented method 1300 may be executed by a storage controller, a storage virtual machine (e.g., SVM 511*a*, SVM 511*b*), a mediator (e.g., mediator 120, mediator 220, mediator 360), a mediator agent, a multi-site distributed storage system, a computer system, a machine, a server, a web appliance, a centralized system, a distributed node, or any system, which includes processing logic (e.g., one or more processors such as processors 1504, a processing resource). The processing logic may include hardware (circuitry, dedicated logic, etc.), software (such as is run on a general purpose computer system or a dedicated machine or a device), or a combination of both.

At block 1310, an operation is received by a node (e.g., one of storage nodes 136*a-n* or storage nodes 146-*n*). The operation may represent a data operation (e.g., WRITE or PUNCH HOLE) or a metadata operation (e.g., CREATE to create a file, OPEN to open a file, RENAME to rename a file, LINK, UNLINK, set attribute (SETATTR) to set a volume size or assign permissions, etc.) to be executed on a file associated with a volume hosted by the node. In one embodiment, by convention, operations to be executed in relation to a particular member volume of a CG may be directed to the monarch node and performed by an SVM (e.g., SVM 511*a* or 511*b*).

At decision block 1320, processing logic (e.g., processing logic of the node, processing logic of a node of the primary storage cluster, processing logic of a node of the secondary storage cluster) determines whether the received Op is of a type that is to be logged. If so, processing continues with decision block 1340; otherwise, processing branches to block 1330. In various examples described herein, the purpose of keeping track of inflight Ops is to facilitate re-establishment of symmetry between the primary storage cluster and the secondary storage cluster. This re-establishment of symmetry may refer to ensuring any changes that are made to the primary storage cluster are also made to the secondary storage cluster. In one embodiment, only operations that perform some kind of modification to a file system, a file, and/or a volume (collectively, referred to herein as "Modify-Ops") are tracked within the Op Logs. Non-Modify-Ops (e.g., READ and GETATTR) need not be tracked as there is reconciliation (e.g., execution of an operation that failed on the secondary cluster, but completed successfully on the primary cluster or undoing of an operation that failed on the primary cluster, but completed successfully on the secondary cluster) to be performed for such operations. According to one embodiment, when the received Op is a Modify-Op, processing continues with decision block 1340 and when the received Op is a non-Modify-Op, processing continues with block 1330.

At block 1330, the processing logic determines that the received Op is not of a type to be logged. As such, no Op Log entry need be created and Op logging is complete for the received Op.

The processing logic determines in decision block 1320 that the received Op is of a type to be logged. As such, at block 1340 it is further determined whether the node that is responsible for executing the received Op is associated with the primary storage cluster. If so, processing continues with block 1342; otherwise processing branches to block 1350. While, in the context of the present example, the amount and/or type of data logged for an Op differs depending upon whether the Op logging is being performed by the primary cluster or the secondary cluster, in alternative embodiments, Op logging may be consistent regardless of where the Op logging is being performed.

As described further below, in some examples, Op Log entries may have a different structure (e.g., more or fewer fields) depending upon the version number (the file version number) of the Op Log file at the time the Op Log entry was created. Depending upon the particular implementation the file version number may be included within a header of the Op Log file or reference may be made to the current version of the storage operating system, which may be used as the file version number of the Op Log. According to one embodiment, creation of the Op Log entry may involve determining the file version number (e.g., from the Op Log or based on the version of the storage operating system), determining a corresponding Op Log entry format based on the file version number, and then creating the Op Log entry having a structure that is based upon the determined format. In some examples, the Op Log entry includes a header and the Op payload, the structure of which may depend further upon the type of operation. When the node's file version number is greater than that of the peer node, the additional fields in the newer version Op Log entries may represent placeholders; otherwise, all fields in the newer version Op Log entries are valid At block 1342, the processing logic determines whether the Op is a write Op or not. If so, then at block 1344, the processing logic creates an Op log entry in the primary storage cluster for minimal details (e.g., a sequence number, a file identifier, and an Op range including offset and length for the write Op) to support replay and reconciliation. At block 1346, the processing logic populates the Op log entry in the primary storage cluster with minimal details (e.g., a sequence number, a file identifier, and an Op range including offset and length for the write Op). However, pay load data of the write Op is not stored.

If the Op is not a write Op at block 1342, then at block 1346 the processing logic creates an Op log entry and populates the Op log entry at block 1348 with complete full details for the Op log entry including a sequence number, a file identifier, an Op range including offset and length, and pay load data of the Op.

Depending upon the particular implementation, an Op Log entry may be populated at the same or a different stage of the Op execution pipeline than creation of the Op Log entry. In one embodiment, the Op Log entry is populated during the modify phase of an Op handler. As noted above, it is desirable to minimize the amount of data logged, for example, to reduce the amount of time for performance of periodic consistency point (CP) generation by the filesystem (which may be performed asynchronously of the write path). According to one embodiment, different data may be stored in the header of the Op Log entry for (i) metadata Ops, (ii) PUNCH-HOLE and partial file SIS-CLONE, and (iii) WRITE. Similarly, the Op payload may or may not be logged depending upon the type of Op. According to one embodiment, the following data is stored as part of the Op Log entry for metadata Ops:

The sequence number of the Op;
The actual Op payload;
The primary inode numbers that were allocated;
The timestamp of the Op execution; and
The inode_net (which may be used for dependent graph (e.g., dependent graph 1212) checks during replay).

In one embodiment, the following data is stored in the Op Log entry for PUNCH-HOLE and partial file SIS-CLONE:

The sequence number of the Op;
The actual Op; and
The timestamp of the Op execution;

In one embodiment, the following data is stored in the Op Log entry for WRITEs:

The sequence number of the Op;
The actual Op (including inode number, offset and length, but excluding the data payload); and
The timestamp of the Op execution;
In one embodiment, during replay/reconciliation, as the Op Log entries for WRITEs does not include the data payload, the data to be replicated to the secondary cluster or the old data to replace a WRITE that is to be undone on the secondary cluster may be read from the file at issue on the primary cluster. Further details regarding undo of WRITEs during IFT-P replay are provided below.

In one implementation, the ability to exclude the data payload from the Op Log entries for WRITEs is enabled by avoiding conflicting operations during synchronous replication. For example, while a volume is in an InSync state (e.g., InSync state 630) of replication, an overlap write manager (OWN) (e.g., OWM 1214) may serialize conflicting operations, for example, to preclude concurrent performance of WRITEs having a range overlap on the same file. When the volume is in an Out of Sync state (e.g., OOS state 640) of replication, and until the resynchronization process has finished (e.g., the volume has returned to the InSync state of replication), execution of Ops on the primary cluster may be disallowed temporarily.

At block 1350 (for node associated with the secondary storage cluster), the processing logic determines whether the Op is a write Op or not. If so, then at block 1352, the processing logic creates an Op log entry and at block 1356 populates the Op log entry in the primary storage cluster with minimal details (e.g., a sequence number, a file identifier, and an Op range including offset and length for the write Op) to support replay and reconciliation. However, pay load data of the write Op is not stored.

If the Op is not a write Op at block 1350, then the processing logic creates an Op log entry for only a sequence number of the Op in the Op log at block 1354 and at block 1358 populates the Op log entry with the sequence number. A file identifier, an Op range including offset and length, and pay load data of the Op are not created at block 1354.

At block 1358, as the existence of an Op Log entry on the secondary storage cluster containing a sequence number of an Op is sufficient in some embodiments to confirm its successful execution, an Op Log entry may be stored containing only the sequence number of the Op. Further data may, but need not be logged. As noted above, while, in the context of the present example, the amount and/or type of data logged for an Op differs depending upon whether the Op logging is being performed by the primary cluster or the secondary cluster, in alternative embodiments, Op logging may be performed consistently on the primary and secondary storage clusters.

In one embodiment, the complete header may be logged for parallel split Ops, like WRITE. In case of sequentially split Ops, it is sufficient to store the sequence number. Performing minimal logging at the secondary cluster, will provide for more efficient operations, for example, by reducing the CP overhead at the destination. Also, it helps save effort in the cases where the Ops are not the same between primary cluster and the secondary cluster.

Following any of blocks 1344, 1346, 1352, and 1356, the <head, tail> pointers of the Op Log file may be updated as noted above.

For completeness, the following is a non-limiting example of a generic Op Log header for the WAFL filesystem:

```
wafl_ssm_OpLog_record_header
/*----------------------------------------------------------
Dep Graph related structures
------------------------------------------------*/
typedef enum wafl_ssm_iftp_replay_barrier {
   VOL_SERIAL_TYPE = 0,
   INODES_SERIAL_TYPE = 1,
   DATA_TYPE = 2,
}wafl_ssm_iftp_replay_barrier_t;
typedef struct wafl_ssm_inode_net {
   enum wafl_Inode_types inode_type;
   uint32_t fileid;
}wafl_ssm_inode_net_entry_t;
typedef struct wafl_ssm_iftp_dgm_inodes {
   wafl_ssm_iftp_replay_barrier_t replay_barrier;
   uint32_t wi_net_total;
   wafl_ssm_inode_net_entry_t ssm_inode_net_entries[6];
} wafl_ssm_iftp_dgm_inodes_t;
/*--------------------------------------------
OpLog record related structures
----------------------------------------------------------*/
/* the active range of Ops as seen by the splitter */
typedef struct iftp_range {
   uint64_t max_acked_seq_num;
   uint64_t op_seq_num;
} wafl_ssm_iftp_range_t;
typedef struct wafl_ssm_OpLog_header {
uint32_t cksum;
   /*
   * Each op record contains the IFT-P version which enables the
   * consumer (e.g., an IFT-P Scanner) to interpret the record
   appropriately.
   */
   uint8_t major_version;
   uint8_t minor_version;
```

```
   /*
   * For most ops, this will be the same as the Op that executed.
   * In case, where the dst msg is expected to be different, the dst
   * msg type will be stored in the below field.
   */
   int32_t replay_msg_type;
   /* Timestamp of Op execution. Needed for maintaining timestamp
   parity at dst. */
   timerep exec_time;
   /* We don't need an entire file handle since this OpLog is AFS
   only entity */
   struct file_identifiers {
      uint32_t fileid;
      uint32_t generation;
      uint16_t flags;
   } ssm_file_id;
   /* Stores the splitter's view of the Inflight Op range. Needed for
   supporting parallel split */
   wafl_ssm_iftp_range_t iftp_range;
   /* During IFT-P replay, this will help subject the Op to Dep
   Graph and accomplish permitted parallelism */
   wafl_ssm_iftp_dgm_inodes_t dgm_inode_info;
   uint32_t op_log_rec_size;
} wafl_ssm_OpLog_header;
/* A copy of wafl_nvlog_cred. Copying this as is since many Ops
do not avoid unix cred check during NVLog replay */
typedef struct wafl_ssm_OpLog_cred
{
   uint16_t flags;
   uint32_t uid;
   uint32_t gid_cnt;
   uint32_t gids[1];
} wafl_ssm_OpLog_cred_t;
```

Undo of WRITEs During IFT-P Replay

In one embodiment, during an IFT-P replay, WRITEs that are committed only onto the secondary cluster are undone by reading from the primary cluster and applying the same to the secondary cluster. This is very much like a QR which is encountered during the steady state. Like in the steady state, the undo may read the old data from primary cluster and apply the same at the secondary cluster and the Op may be logged on the secondary cluster as a successfully completed QR like in the steady state.

Of particular interest here is the handling of the case where there is WRITE which that is not block aligned (offset/length or both) and the original file block numbers is a hole. For example, the WAFL filesystem has a default disk block size of 4 KB (or 4k). Assuming for purposes of the present example a 4 k block size, during splitting, an OWM would have been taken at the byte range for which the WRITE was issued. A punch-hole (due to undo) should only be issued at 4k boundary and for the whole block. The following are examples of various options for addressing the same:

QR (for unaligned write) drops existing OWM unconditionally and obtains a lock for the extended range (4k boundary aligned range).

QR drops existing OWM only if the unaligned WRITE was onto an earstwhile hole.

For IFT-P replay, punch holes without an extended range lock.

QR issues zero filled writes for unaligned PunchHoles.

Figure 14:
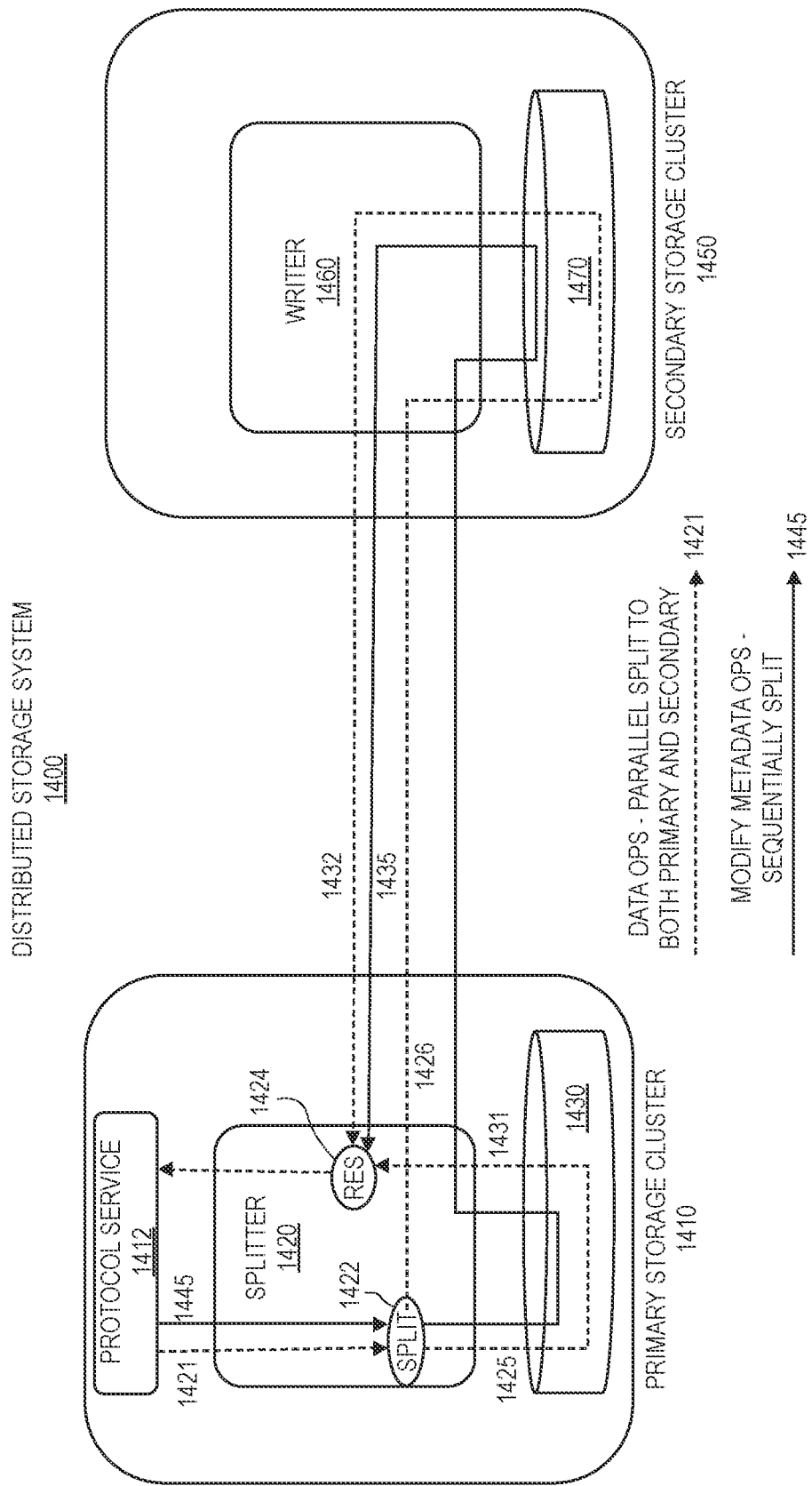
FIG. 14 illustrates parallel splitting of data Ops and sequentially splitting of modifying metadata Ops for a multi-site distributed storage system having synchronous replication (SR) between primary and secondary sites in accordance with one embodiment.

FIG. 14 illustrates parallel splitting of data Ops and sequentially splitting of modifying metadata Ops for a multi-site distributed storage system having synchronous replication (SR) between primary and secondary sites in accordance with one embodiment. The multi-site distributed storage system 1400 includes a splitter component 1420 and a primary file system 1430 that are located in a primary storage cluster 1410 while a writer 1460 and a secondary file system 1470 are located in a secondary storage cluster 1450. The granularity of protection and failover is a consistency group, which is a plurality of volumes that together host application data.

Initially, operations are received and handled by a protocol service 1412 (e.g., network attached storage (NAS) protocol service, storage area network (SAN) protocol service, such as Small Computer System Interface (SCSI) or Fiber Channel Protocol (FCP), etc.) of the primary cluster 1430 and then the operations can be queued in a queue 1422 of splitter component 1420. The operations may represent a data operation (e.g., WRITE or PUNCH HOLE) or a metadata operation (e.g., CREATE, OPEN, RENAME, LINK, UNLINK, set attribute (SETATTR), etc.) to be executed on a file associated with a volume hosted by a node of a storage cluster (e.g., primary storage cluster 1410, secondary storage cluster 1450). In one embodiment, by convention, operations to be executed in relation to a particular member volume of a CG may be directed to the monarch node and performed by an SVM (e.g., SVM 511a or 511b).

An entry for the Op is added to the queue. The protocol service 1412 or splitter component 1420 will determine whether the Op is a data operation or a metadata operation to be executed on a file. If a data operation is being processed, then a parallel split process 1421 causes the data operation to be sent along paths 1425 and 1426 to the file systems 1430 and 1470, respectively, in parallel simultaneously. Next, the file system 1430 computes a location for a record of the data operation, inserts the data operation, updates a log marker if permitted, and deletes any older entries in the Op log of the primary storage cluster if these entries are not needed.

The splitter component 1420 will update the record state in splitter active Ops as responded for the data operation. The replicated data operation is sent to writer 1460 to be executed on a replicated storage object. The replicated data Op is provided into a record of file system 1470, which also computes a location for a record of the replicated Op, inserts the replicated Op, updates a log marker if permitted, and deletes any older entries in the Op log if these entries are not needed. Subsequently, the result processor 1424 will receive updates for the data operation along paths 1431 and 1432. The record state in splitter active Ops are updated as responded for the data operation. The result processor 1424 sends updates to the protocol service 1412.

If a metadata operation is being processed, then a sequential split process 1445 causes the metadata operation to be sent initially to the file system 1430 and then sequentially to the file system 1470. The splitter component 1420 will update the record state in splitter active Ops as responded for the data operation. The replicated data operation is sent to writer 1460 to be executed on a replicated storage object. Subsequently, the result processor 1424 will receive an update for the data operation along sequential path 1435. The record state in splitter active Ops are updated as responded for the data operation. The result processor 1424 sends updates to the protocol service 1412.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 15:
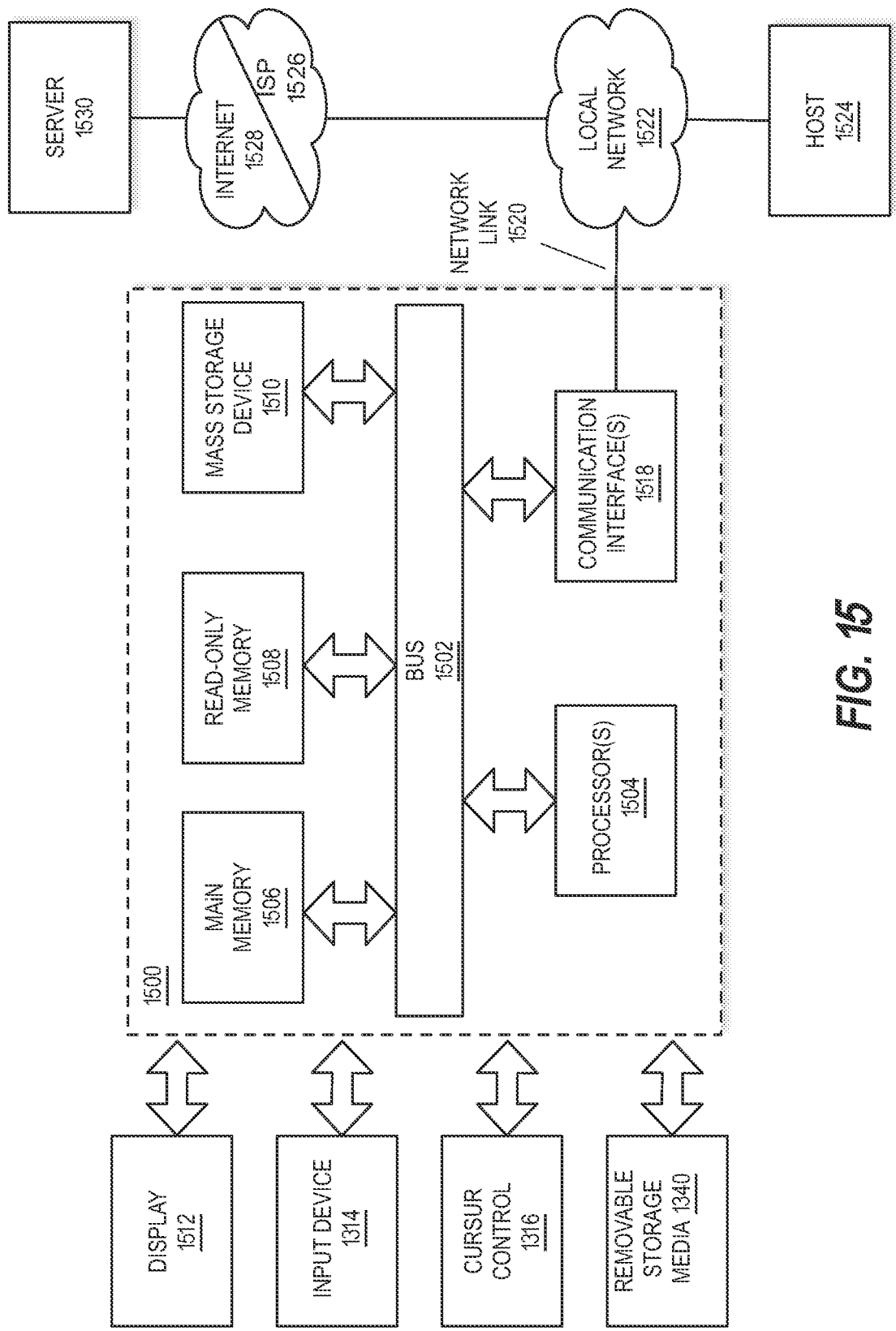
FIG. 15 illustrates an example computer system in which or with which embodiments of the present disclosure may be utilized.

FIG. 15 is a block diagram that illustrates a computer system 1500 in which or with which an embodiment of the present disclosure may be implemented. Computer system 1500 may be representative of all or a portion of the computing resources associated with a node (e.g., storage nodes 136a-n or storage nodes 146a-n) of a distributed storage system (e.g., cluster 235 or 245) or an administrative workstation (e.g., computer system 110 or 210). Notably, components of computer system 1500 described herein are meant only to exemplify various possibilities. In no way should example computer system 1500 limit the scope of the present disclosure. In the context of the present example, computer system 1500 includes a bus 1502 or other communication mechanism for communicating information, and a processing resource (e.g., a hardware processor 1504) coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, e.g., a magnetic disk, optical disk or flash disk (made of flash memory chips), is provided and coupled to bus 1502 for storing information and instructions.

Computer system 1500 may be coupled via bus 1502 to a display 1512, e.g., a cathode ray tube (CRT), Liquid Crystal Display (LCD), Organic Light-Emitting Diode Display (OLED), Digital Light Processing Display (DLP) or the like, for displaying information to a computer user. An input device 1514, including alphanumeric and other keys, is coupled to bus 1502 for communicating information and command selections to processor 1504. Another type of user input device is cursor control 1516, such as a mouse, a trackball, a trackpad, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Removable storage media 1540 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1500 may implement the techniques described herein using customized hard-wired logic, one or more ASICs or FPGAs, firmware or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1510. Volatile media includes dynamic memory, such as main memory 1506. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1118. In the Internet example, a server 1530 might transmit a requested code for an application program through Internet 1528, ISP 1526, local network 1522 and communication interface 1518. The received code may be executed by processor 1504 as it is received, or stored in storage device 1510, or other non-volatile storage for later execution.

What is claimed is:

1. A computer implemented method performed by one or more processing resources of a distributed storage system, the method comprising:
   initiating a resynchronization process due to a failure or loss of connectivity of a storage object of a primary storage cluster with the storage object becoming out of sync as an internal state while maintaining an external state as in sync for external entities in order to provide time for reestablishing synchronous replication between the storage object and a replicated storage object of a secondary storage cluster within duration of an operation (Op) timeout period; and
   performing the resynchronization process between the storage object and the replicated storage object based on using a first Op log of the primary storage cluster and a second Op log of the secondary storage cluster.

2. The computer implemented method of claim 1, wherein the resynchronization process is based on reestablishing a Sync Data Path between a data copy of the storage object and a mirrored data copy of the replicated storage object.

3. The computer implemented method of claim 1, wherein the resynchronization resumes zero recovery point objective (RPO) protection.

4. The computer implemented method of claim 1, further comprising:
initiating persistent inflight tracking and reconciliation of I/O operations based on the first Op log of the primary storage cluster and the second Op log of the secondary storage cluster;
replaying the I/O operations from one of the first and second Op logs; and
reconciling the I/O operations in the first Op log with the I/O operations in the second Op log by determining whether an Op being considered is present or absent in both of the first and second Op logs and skipping the Op if the Op is present or absent in both of the first and second Op logs from the primary and secondary storage clusters.

5. The computer implemented method of claim 1, further comprising:
transitioning a consistency group (CG) for a node of the storage object to out of sync (OOS) when the resynchronization experiences an error or failure resulting in expiration of the Op timeout period.

6. The computer implemented method of claim 1, wherein the I/O operations for the storage object are temporarily disallowed until resumption of synchronous replication and this avoids dependent write order inconsistencies.

7. A non-transitory computer-readable storage medium embodying a set of instructions, which when executed by one or more processing resources of a multi-site distributed storage system cause the one or more processing resources to:
initiate a resynchronization process due to a failure or loss of connectivity of a storage object of a node of a primary storage cluster with the storage object of the node becoming out of sync as an internal state while maintaining an external state as in sync for external entities in order to provide time for reestablishing synchronous replication between the storage object and a replicated storage object of a secondary storage cluster within duration of an operation (Op) timeout period; and
perform the resynchronization process between the storage object and the replicated storage object based on using a first Op log of the primary storage cluster and a second Op log of the secondary storage cluster.

8. The non-transitory computer-readable storage medium of claim 7, wherein the resynchronization is based on reestablishing a Sync Data Path between a data copy of the storage object and a mirrored data copy of the replicated storage object.

9. The non-transitory computer-readable storage medium of claim 7, wherein the resynchronization resumes zero recovery point objective (RPO) protection.

10. The non-transitory computer-readable storage medium of claim 7, wherein the instructions when executed by the one or more processing resources cause the one or more processing resources to:
initiating persistent inflight tracking and reconciliation of I/O operations based on the first Op log of the primary storage cluster and the second Op log of the secondary storage cluster;
replaying the I/O operations from one of the first and second Op logs; and
reconciling the I/O operations in the first Op log with the I/O operations in the second Op log by determining whether an Op being considered is present or absent in both of the first and second Op logs and skipping the Op if the Op is present or absent in both of the first and second Op logs from the primary and secondary storage clusters.

11. The non-transitory computer-readable storage medium of claim 7, wherein the instructions when executed by the one or more processing resources cause the one or more processing resources to:
transition a consistency group (CG) for the node of the storage object to out of sync (OOS) state when the resynchronization experiences an error or failure resulting in expiration of the Op timeout period.

12. The non-transitory computer-readable storage medium of claim 7, wherein the input/output (I/O) operations for the storage object are temporarily disallowed until resumption of synchronous replication and this avoids dependent write order inconsistencies.

13. A multi-site distributed storage system having a primary storage site with a primary storage cluster and a secondary storage site with a secondary storage cluster, comprising:
one or more processing resources; and
a non-transitory computer-readable medium coupled to the one or more processing resources, having stored therein instructions, which when executed by the one or more processing resources cause the one or more processing resources to:
maintain a first operation (Op) Log for a first volume and a second Op Log for a second volume to be capable of facilitating resynchronization between a dataset stored on the first volume of the primary storage cluster of the distributed storage system and a mirror copy of the dataset stored on the second volume of the secondary storage cluster of the distributed storage system;
receive an operation associated with a file within the dataset;
determine whether the operation is a modifying operation; and
create an operation (Op) log entry with one of the first and second Op Logs if the operation is a modifying operation to cause a modification of the file.

14. The multi-site distributed storage system of claim 13, wherein the instructions when executed by the one or more processing resources cause the one or more processing resources to:
determine whether a storage node that is responsible for executing the operation is associated with the primary storage cluster; and
determine whether the operation is a write operation or not, wherein the Op log entry contains a sequence number assigned to the operation, and wherein the Op log entry is not required to contain data associated with the operation when the operation comprises a write operation.

15. The multi-site distributed storage system of claim 14, wherein the instructions when executed by the one or more processing resources cause the one or more processing resources to:

store a sequence number, a file identifier, and an Op range including offset and length for the operation when the operation is a write operation, wherein pay load data of the write operation is not stored.

16. The multi-site distributed storage system of claim 14, wherein the instructions when executed by the one or more processing resources cause the one or more processing resources to:

store data for an Op log entry including a sequence number, a file identifier, an Op range including offset and length, and pay load data of the operation when the operation is not a write Op and the storage node that is responsible for executing the operation is associated with the primary storage cluster.

17. The multi-site distributed storage system of claim 14, wherein the instructions when executed by the one or more processing resources cause the one or more processing resources to:

store data for an Op log entry including a sequence number and no pay load data when the operation is not a write operation and the storage node that is responsible for executing the operation is associated with the secondary storage cluster.

18. The multi-site distributed storage system of claim 13, wherein different data is stored in a header of the Op Log entry for metadata operations, deallocate space operations, and write operations.

19. The multi-site distributed storage system of claim 13, wherein the entry is populated during a modify phase of an Op handler.

20. The multi-site distributed storage system of claim 13, wherein the instructions when executed by the one or more processing resources cause the one or more processing resources to:

execute a write operation on the mirror copy by reading data from the file; or undoing, by the secondary storage cluster, the write operation on the mirror copy by replacing the data stored as a result of prior execution of the write operation on mirror copy with old data read from the file.

* * * * *